(12) United States Patent
Kodama et al.

(10) Patent No.: US 8,914,203 B2
(45) Date of Patent: *Dec. 16, 2014

(54) DEVICE AND METHOD FOR CONTROLLING A BELT-TYPE CONTINUOUSLY VARIABLE TRANSMISSION FOR A VEHICLE

(75) Inventors: Yoshihisa Kodama, Fuji (JP); Yasuaki Yoshikawa, Fuji (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 255 days.

This patent is subject to a terminal disclaimer.

(21) Appl. No.: 13/515,562

(22) PCT Filed: Dec. 15, 2009

(86) PCT No.: PCT/JP2009/070863
§ 371 (c)(1),
(2), (4) Date: Jun. 13, 2012

(87) PCT Pub. No.: WO2011/074063
PCT Pub. Date: Jun. 23, 2011

(65) Prior Publication Data
US 2012/0258825 A1 Oct. 11, 2012

(51) Int. Cl.
G06F 7/00 (2006.01)
F16H 61/662 (2006.01)
F16H 63/50 (2006.01)
F16H 59/18 (2006.01)

(52) U.S. Cl.
CPC .......... F16H 61/66272 (2013.01); F16H 63/50 (2013.01); F16H 2059/183 (2013.01)
USPC ................... 701/51; 477/45; 477/46

(58) Field of Classification Search
CPC ...................... F16H 61/66272; F16H 2059/183
See application file for complete search history.

(56) References Cited

U.S. PATENT DOCUMENTS 4,649,486 A * 3/1987 Oshiage .......................... 701/61
4,735,597 A 4/1988 Cadee
(Continued)

FOREIGN PATENT DOCUMENTS

CN 1654851 A 8/2005
CN 1657803 A 8/2005
(Continued)

OTHER PUBLICATIONS

Russian Decision on Grant with English Language Translation dated Aug. 23, 2013, (9 pages).

(Continued)

*Primary Examiner* — David D Le
(74) *Attorney, Agent, or Firm* — Foley & Lardner LLP

(57) ABSTRACT

A control device for a vehicle belt type continuously variable transmission includes primary and secondary pulleys around which a belt is wound so as to generate a belt clamping force according to an input torque by controlling a secondary hydraulic pressure. The device includes a belt slip controller performing belt slip control by oscillating the secondary hydraulic pressure and extracting an oscillation component when a change speed of the input torque is less than a predetermined value. The device further includes a limit determining control unit determining whether to limit acceleration, and an input torque change speed limiter control unit limiting the change speed to less than the predetermined value when the limit determining unit makes a determination to limit acceleration. The belt slip controller permits belt slip control while the input torque change speed limiter control unit limits the change speed to less than the predetermined value.

9 Claims, 14 Drawing Sheets

(56) References Cited

U.S. PATENT DOCUMENTS

| | | | |
|---|---|---|---|
| 5,766,105 | A | 6/1998 | Fellows et al. |
| 7,179,196 | B2 * | 2/2007 | Oshita et al. ............... 477/46 |
| 7,189,184 | B2 | 3/2007 | Oshiumi et al. |
| 7,774,120 | B2 | 8/2010 | Yamaguchi et al. |
| 7,819,764 | B2 | 10/2010 | Kimura et al. |
| 7,892,141 | B2 | 2/2011 | Yamaguchi et al. |
| 8,133,140 | B2 | 3/2012 | Yamaguchi et al. |
| 8,600,634 | B2 | 12/2013 | Van Der Sluid et al. |
| 2002/0155910 | A1 | 10/2002 | Nishizawa et al. |
| 2004/0242355 | A1 | 12/2004 | Yamaguchi et al. |
| 2005/0181909 | A1 | 8/2005 | Oshiumi et al. |
| 2005/0192133 | A1 | 9/2005 | Oshiumi et al. |
| 2007/0197320 | A1 | 8/2007 | Kimura et al. |
| 2007/0232424 | A1 * | 10/2007 | Nishida ..................... 474/28 |
| 2008/0146409 | A1 | 6/2008 | Yamaguchi et al. |
| 2009/0299588 | A1 | 12/2009 | Kawasumi et al. |
| 2010/0198467 | A1 | 8/2010 | Van Der Noll |
| 2012/0108373 | A1 | 5/2012 | Doihara et al. |
| 2012/0252612 | A1 * | 10/2012 | Kodama et al. ............... 474/69 |
| 2012/0258825 | A1 | 10/2012 | Kodama et al. |

FOREIGN PATENT DOCUMENTS

| | | | |
|---|---|---|---|
| CN | 101592219 A | 12/2009 |
| EP | 1236935 A2 | 9/2002 |
| EP | 1 329 650 A2 | 7/2003 |
| EP | 1482216 A2 | 12/2004 |
| EP | 1 698 805 A2 | 9/2006 |
| JP | 04-013575 B2 | 3/1992 |
| JP | 04-203557 A | 7/1992 |
| JP | 2001-304389 A | 10/2001 |
| JP | 2003-65428 A | 3/2003 |
| JP | 2003-202075 A | 7/2003 |
| JP | 2003-236509 A | 8/2003 |
| JP | 2004-293652 A | 10/2004 |
| JP | 2004-293654 A | 10/2004 |
| JP | 2004-316860 A | 11/2004 |
| JP | 2004-353703 A | 12/2004 |
| JP | 2004-358999 A | 12/2004 |
| JP | 2005-030511 A | 2/2005 |
| JP | 2007-211855 A | 8/2007 |
| JP | 2008-151198 A | 7/2008 |
| JP | 2009-255617 A | 11/2009 |
| RU | 2012833 C1 | 5/1994 |
| RU | 2 133 895 C1 | 7/1999 |
| SU | 1454242 A3 | 1/1989 |
| SU | 1682691 A1 | 10/1991 |
| SU | 1733279 A1 | 5/1992 |
| WO | WO-2009/006943 A1 | 1/2009 |
| WO | WO-2009/007144 A1 | 1/2009 |
| WO | WO 2009/007450 A2 | 1/2009 |

OTHER PUBLICATIONS

Russian Decision on Grant with English Language Translation dated Aug. 21, 2013, (9 pages).
U.S. Appl. No. 13/515,565, filed Jun. 13, 2012, Kodama et al.
Hartmut Faust et al., Efficiency-Optimised CVT Clamping System, 7$^{th}$ Luk Symposium 2002, pp. 75-87.
Chinese Office Action dated Mar. 14, 2014 (8 pgs.).
Chinese Office Action dated Mar. 24, 2014 (8 pgs.).
H. Faust et al., "Efficiency-Optimised CVT Clamping System", *Drive System Technique*, Dec. 30, 2004, pp. 18-26.
Y. Kodama et al., US PTO Non-Final Office Action, U.S. Appl. No. 13/515,565 dated May 5, 2014, (14 pgs.).
Supplementary European Search Report, dated Jun. 3, 2014, 4 pages.
Russian Office Action and English Translation, dated Mar. 5, 2013, 15 pages.
K. Doihara, U.S. PTO Official Action, U.S. Appl. No. 13/266,823, dated May 2, 2014, 17 pages.
K. Doihara, U.S. PTO Official Action, U.S. Appl. No. 13/266,804, dated May 9, 2014, 14 pages.
K. Doihara, U.S. PTO Official Action, U.S. Appl. No. 13/266,816, dated May 29, 2014, 20 pages.
K. Doihara, U.S. PTO Notice of Allowance, U.S. Appl. No. 13/266,830, dated May 27, 2014, 18 pages.
K. Doihara et al., USPTO Notice of Allowance, U.S. Appl. No. 13/266,823, dated Aug. 18, 2014, (11 pgs.).
Y. Kodama et al., USPTO Notice of Allowance, U.S. Appl. No. 13/515,565, dated Aug. 20, 2014, (12 pgs.).

* cited by examiner

DEVICE AND METHOD FOR CONTROLLING A BELT-TYPE CONTINUOUSLY VARIABLE TRANSMISSION FOR A VEHICLE

TECHNICAL FIELD

The present invention relates to a device and a method for controlling a vehicle belt type continuously variable transmission to perform a belt slip control in which a belt wound around pulleys is slipped at a predetermined slip rate.

BACKGROUND ART

A known belt type continuously variable transmission controller is configured to perform a belt slip control in which an actual secondary hydraulic pressure is reduced from one during a normal control to slip a belt wound around pulleys at a predetermined slip rate by the following steps:

(a) superimposing a predetermined sine wave on a command secondary hydraulic pressure or oscillating the command secondary hydraulic pressure, and (b) performing the belt slip control by controlling the actual secondary hydraulic pressure on the basis of a multiplier of an oscillation component due to the oscillation included due to the oscillation in the actual secondary hydraulic pressure and an oscillation component included in an actual gear ratio.

This eliminates the necessity for directly detecting the belt slip rate and thereby facilitates the belt slip control (see Patent Document 1, for example).

PRIOR ART DOCUMENT

Patent Document

Patent Document 1: WO 2009/007450 A2 (PCT/EP2008/059092)

SUMMARY OF THE INVENTION

Problems to be Solved by the Invention

However, when a change speed of the input torque to the belt type continuously variable transmission controller is high, a change speed of the secondary hydraulic pressure is increased according to the high change speed of the input torque, so that the known belt type continuously variable transmission controller cannot extract the oscillation component due to the oscillation included in the actual secondary hydraulic pressure from the basic component of the actual secondary hydraulic pressure which corresponds to a magnitude of the input torque. Because of this, by performing belt slip control using, as a belt slip condition estimated value, a multiplier of the oscillation components included in the actual gear ratio and in the actual secondary hydraulic pressure to have the value coincide with a predetermined value, the belt may greatly slip depending on a magnitude of the input torque to the belt type continuously variable transmission controller due to an insufficient control accuracy caused by an error in the estimated belt slip condition.

In view of the above problem, the present invention aims to provide a vehicle belt type continuously variable transmission control device and method which can improve the reducing effects of drive energy consumption owing to a decrease in belt friction by expanding an operation range in which the belt slip control is permitted, with the accuracy of an estimated belt slip condition maintained.

Means to Solve the Problem

In view of achieving the above object, a belt type continuously variable transmission of a vehicle according to the present invention comprises a primary pulley and a secondary pulley around which a belt is wound so as to generate a belt clamping force according to an input torque from a driving source by controlling a secondary hydraulic pressure. A control device therefore comprises a belt slip control means, a limit determining means, and an input torque change speed limiting means. The belt slip control means oscillates the secondary hydraulic pressure and extracts an oscillation component due to oscillation from a basic component of an actual secondary hydraulic pressure when a change speed of the input torque is less than a predetermined value, so as to control the secondary hydraulic pressure based on a phase difference between an oscillation component of an actual gear ratio and the oscillation component of the actual secondary hydraulic pressure due to oscillation. The limit determining means determines whether to limit acceleration of the vehicle. The input torque change speed limiting means limits the change speed of the input torque to less than the predetermined value when the limit determining means makes a determination to limit the acceleration of the vehicle. The belt slip control means permits the belt slip control while the input torque change speed limiting means is limiting the change speed of the input torque to less than the predetermined value.

Effects of the Invention

The belt slip control means is configured to permit the belt slip control when the input torque change speed is less than the predetermined value. Thereby, with a high estimated accuracy of a belt slip condition, driving energy consumption can be reduced by a decrease in belt friction while with a low estimated accuracy of a belt slip condition, a large belt slippage during the belt slip control can be prevented.

In addition, when the limit determining means decides that the acceleration of the vehicle can be limited, the input torque change speed limiting means limits the change speed of the input torque to less than the predetermined value and permits the belt slip control to expand an operation range in which the belt slip control is permitted. That is, the operation range can be expanded by a belt slip control permitted range under the acceleration limit permitting condition from that under the input torque change speed condition which depends on the change speed of input torque which occurs with a driver's accelerator operation. Accordingly, the estimated accuracy of the belt slip condition can be maintained by limiting the input torque change speed to less than the predetermined value in the added operation range.

Thus, it is made possible to effectively reduce the driving energy consumption owing to a decrease in belt friction by expanding the operation range in which the belt slip control is permitted with the estimated accuracy of the belt slip condition maintained.

EMBODIMENTS OF DESCRIPTION

Figure 1:
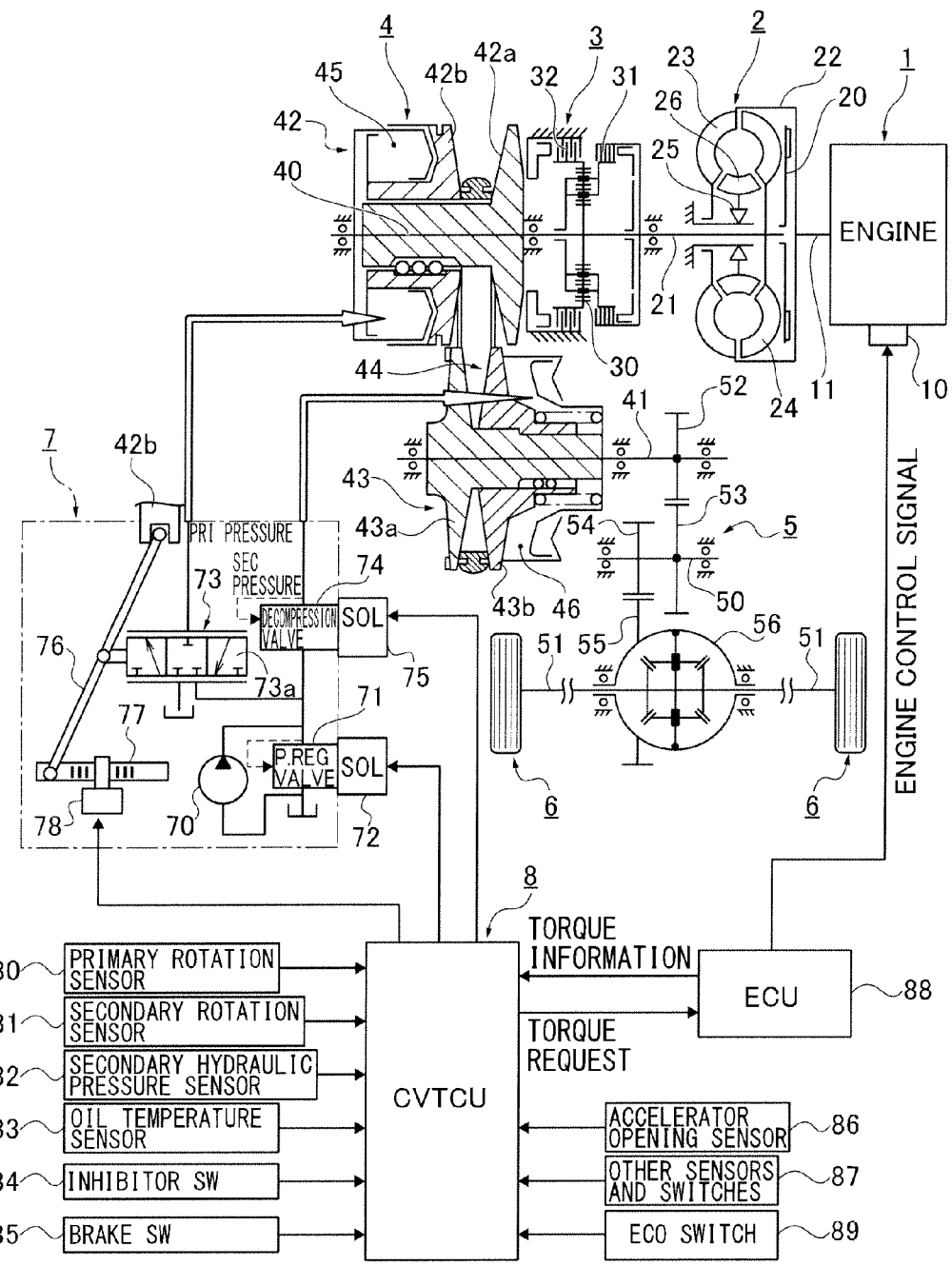
FIG. 1 shows the entire system of a drive system and a control system of a vehicle incorporating a belt type continuously variable transmission applied with a control device and method according to a first embodiment.
Figure 2:
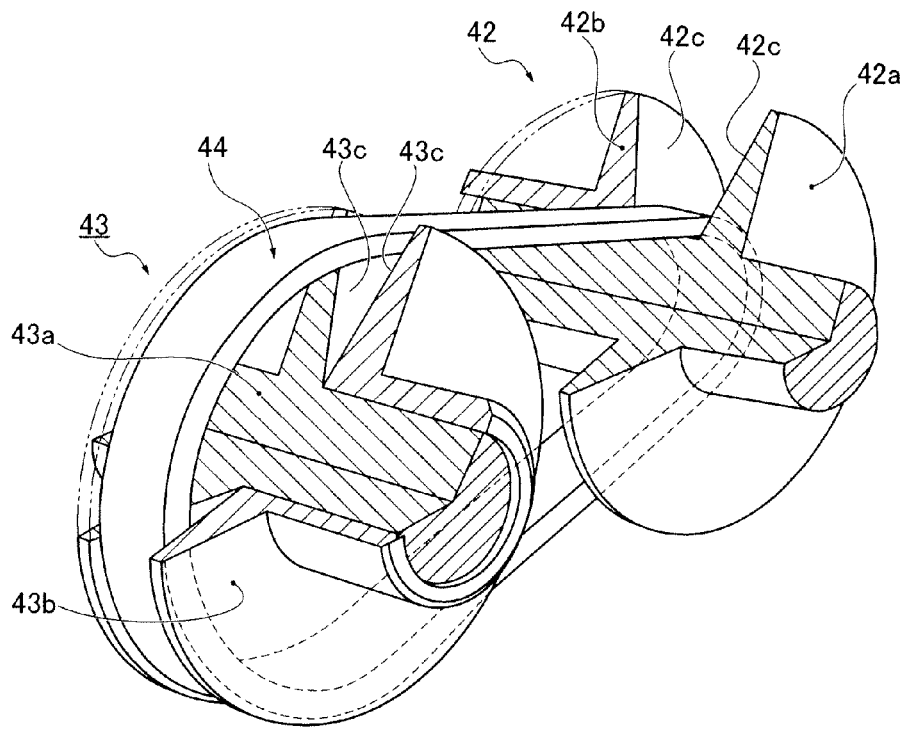
FIG. 2 is a perspective view of the belt type continuously variable transmission mechanism applied with the control device and method according to the first embodiment.
Figure 3:
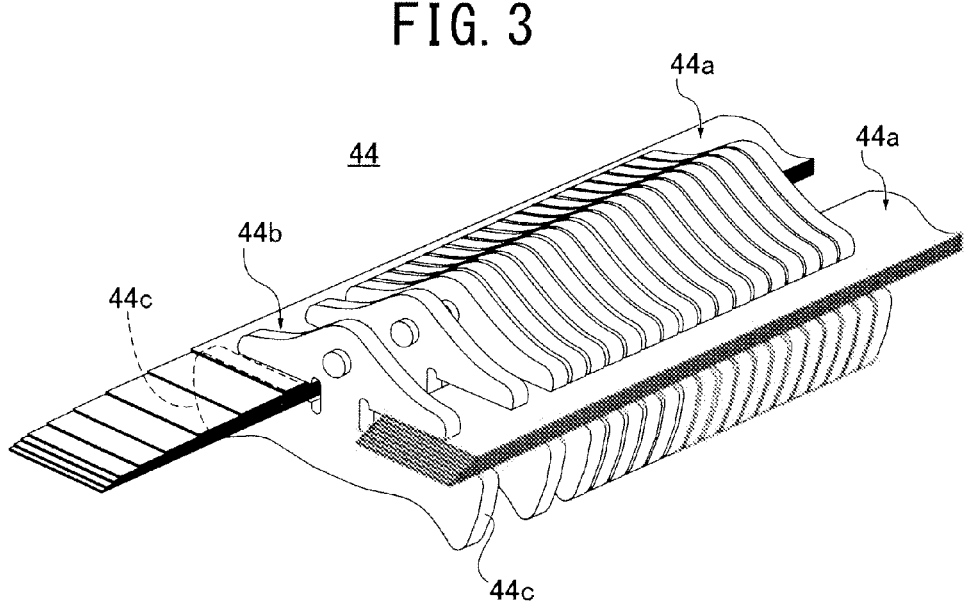
FIG. 3 is a perspective view of a part of a belt of the belt type continuously variable transmission mechanism applied with the control device and method according to the first embodiment.

Hereinafter, the best mode to carry out the control device and method for a belt type continuously variable transmission will be described using a first embodiment with reference to the accompanying drawings.
First Embodiment First, the structure of the device is described. FIG. 1 shows the entire system of a drive system and a control system of a vehicle incorporating a belt type continuously variable transmission applied with a control device and method according to the first embodiment. FIG. 2 is a perspective view of the belt type continuously variable transmission mechanism applied with the control device and method according to the first embodiment. FIG. 3 is a perspective view of a part of a belt of a belt type continuously variable transmission mechanism applied with the control device and method according to the first embodiment. In the following the system structures are described with reference to FIGS. 1 to 3.

In FIG. 1 the drive system of a vehicle incorporating a belt type continuously variable transmission comprises an engine 1, a torque converter 2, a forward/backward drive switch mechanism 3, a belt type continuously variable transmission mechanism 4, a final reduction mechanism 5 and drive wheels 6, 6.

The output torque of the engine 1 is controllable by an engine control signal supplied from the exterior in addition to by a driver's accelerator operation. The engine 1 includes an output torque control actuator 10 to control the output torque by a throttle valve opening/closing operation, a fuel cut operation and else. The change speed (=change rate) of the input torque to the belt type continuously variable transmission 4 is controlled by the output torque control of the engine 1.

The torque converter 2 is a startup element with a torque increasing function and includes a lockup clutch 20 to be able to directly connect an engine output shaft 11 (=torque converter input shaft) and a torque converter output shaft 21. The torque converter 2 is comprised of a turbine runner 23 connected with the engine output shaft 11 via a converter housing 22, an impeller pump 24 connected with the torque converter output shaft 21, and a stator 26 provided via a one-way clutch 25.

The forward/backward drive switch mechanism 3 is to switch a rotary direction input to the belt type continuously variable transmission mechanism 4 between a normal rotary direction during forward traveling and a reverse rotary direction during backward traveling. The forward/backward switch mechanism 3 includes a double pinion planetary gear 30, a forward clutch 31, and a backward brake 32. A sun gear of the double pinion planetary gear 30 is connected with the torque converter output shaft 21 and a carrier thereof is connected with a transmission input shaft 40. The forward clutch 31 is fastened during a backward traveling to fix a ring gear of the double pinion planetary gear 30 to the case.

The belt type continuously variable transmission mechanism 4 has a continuously variable transmission function to steplessly vary the gear ratio by changing a belt contact radius. The gear ratio is a ratio of the input rotation rate of the transmission input shaft 40 and the output rotation rate of the transmission output shaft 41. The belt type continuously variable transmission mechanism 4 includes a primary pulley 42, a secondary pulley 43, and a belt 44. The primary pulley 42 is made up of a fixed pulley 42a and a slide pulley 42b. The slide pulley 42b is slid by primary hydraulic pressure introduced into a primary hydraulic pressure chamber 45. The secondary pulley 43 is made up of a fixed pulley 43a and a slide pulley 43b. The slide pulley 43b is slid by primary hydraulic pressure introduced into a secondary hydraulic pressure chamber 46. The belt 44 as shown in FIG. 2 is wrapped around V-form sheave faces 42c, 42d of the primary pulley 42 and V-form sheave faces 43c, 43d of the secondary pulley 43. In FIG. 3 the belt 44 is formed of two laminated rings 44a, 44a of which a large number of rings are layered from inside to outside as well as a large number of elements 44b of press-cut plates placed between the two laminated rings 44a, 44a and connected with each other in a ring-form. The elements 44b each includes, at both sides, flank faces 44c, 44c to contact with the sheave faces 42c, 42d of the primary pulley 42 and the sheave faces 43c, 43d of the secondary pulley 43.

The final reduction mechanism 5 decelerates the transmission output rotation from the transmission output shaft 41 of the belt type continuously variable transmission mechanism 4 and provides a differential function thereto to transmit it to the right and left drive wheels 6, 6. The final reduction mechanism 5 is interposed among the transmission output shaft 41, an idler shaft 50, right and left drive shafts 51, 51, and includes a first gear 52, a second gear 53, a third gear 54, and a fourth gear 55 with a deceleration function and a gear differential gear 56 with a differential function.

The control system of the belt type continuously variable transmission comprises a transmission hydraulic pressure control unit 7 and a CVT control unit 8, as shown in FIG. 1.

The transmission hydraulic pressure control unit 7 is a hydraulic pressure control unit to produce primary hydraulic pressure introduced into the primary hydraulic pressure chamber 45 and secondary hydraulic pressure introduced into the secondary hydraulic pressure chamber 46. The transmission hydraulic pressure control unit 7 comprises an oil pump 70, a regulator valve 71, a line pressure solenoid 72, a transmission control valve 73, a decompression valve 74, a secondary hydraulic pressure solenoid 75, a servo link 76, a transmission command valve 77, and a step motor 78.

The regulator valve 71 uses discharged pressure from the oil pump 70 as a pressure source to adjust line pressure PL. The regulator valve 71 includes the line pressure solenoid 72 to adjust the pressure of oil from the oil pump 70 to a predetermined line pressure PL in response to a command from the CVT control unit 8.

The transmission control valve 73 uses the line pressure PL produced by the regulator valve 71 as a pressure source to adjust the primary hydraulic pressure introduced into the primary hydraulic pressure chamber 45. A spool 73a of the transmission control valve 73 is connected with the servo link 76 constituting a mechanical feedback mechanism and the transmission command valve 77 connected with one end of the servo link 76 is driven by the step motor 78 so that the transmission control valve receives feedback of a slide position (actual pulley ratio) from the slide pulley 42b of the primary pulley 42 connected with the other end of the servo link 76. That is, during transmission, when the step motor 78 is driven in response to a command from the CVT control unit 8, the spool 73a of the transmission control valve 73 is changed in position to supply/discharge the line pressure PL to/from the primary hydraulic pressure chamber 45 to adjust the primary hydraulic pressure to acquire a target gear ratio commanded at the drive position of the step motor 78. Upon completion of the transmission, the spool 73a is held at a closed position in response to a displacement of the servo link 76.

The decompression valve 74 uses the line pressure PL produced by the regulator valve 71 as a pressure source to adjust the secondary hydraulic pressure introduced into the secondary hydraulic pressure chamber 46 by decompression. The decompression valve 74 comprises the secondary hydraulic pressure solenoid 75 to decompress the line pressure PL to a command secondary hydraulic pressure in accordance with a command from the CVT control unit 8.

The CVT control unit 8 is configured to perform various control such as a gear ratio control to output to the step motor 78 a control command to acquire a target gear ratio in accordance with vehicle speed, throttle opening condition and else, a line pressure control to output to the line pressure solenoid 72 a control command to acquire a target line pressure in accordance with the throttle opening condition or else, a secondary hydraulic pressure control to output to the secondary hydraulic pressure solenoid 75 a control command to acquire a target secondary pulley thrust in accordance with transmission input torque or else, a forward and backward switch control to control the fastening and release of the forward clutch 31 and backward brake 32, and a lockup control to control fastening and release of the lockup clutch 20. The CVT control unit 8 receives various sensor information and switch information from a primary rotation sensor 80, a secondary rotation sensor 81, a secondary hydraulic pressure sensor 82, an oil temperature sensor 83, an inhibitor switch 84, a brake switch 85, an accelerator opening sensor 86, and other sensors and switches 87. Further, it receives torque information from an engine control unit 88 and outputs a torque request to the engine control unit 88. In addition, it receives switch information from an ECO switch 89 (switch) to allow a driver to select a normal drive mode or an economical drive mode.

Figure 4:
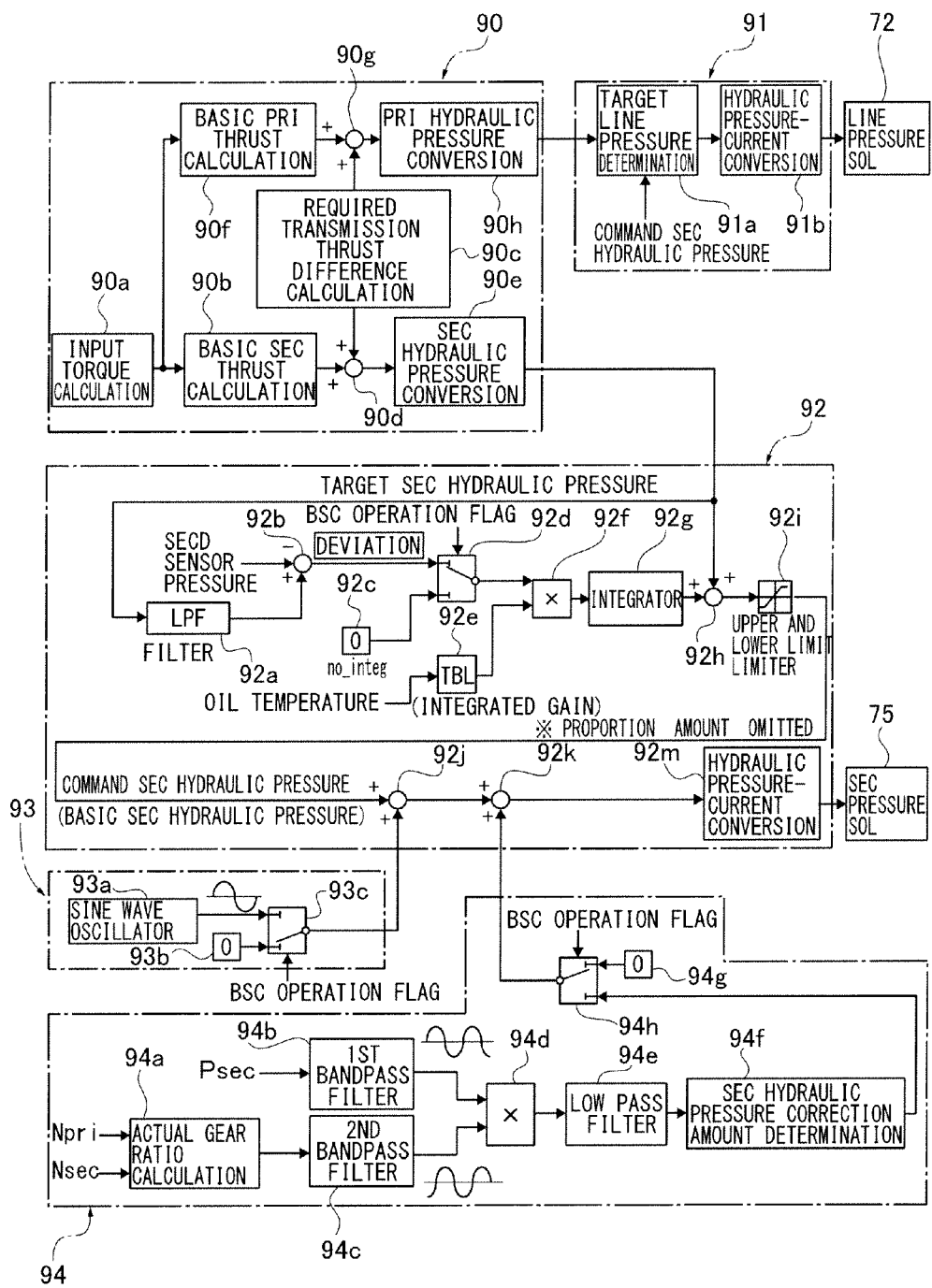
FIG. 4 is a control block diagram of the line pressure control and secondary hydraulic pressure control (normal control/belt slip control) executed by a CVT control unit 8 according to the first embodiment.

FIG. 4 is a control block diagram of the line pressure control and secondary hydraulic pressure control (normal control/belt slip control) executed by the CVT control unit 8 according to the first embodiment.

The hydraulic pressure control system of the CVT control unit 8 in the first embodiment comprises a basic hydraulic pressure calculator 90, a line pressure controller 91, a secondary hydraulic pressure controller 92, a sine wave oscillation controller 93, and a secondary hydraulic pressure corrector 94, as shown in FIG. 4.

The basic hydraulic pressure calculator 90 includes an input torque calculator 90a to calculate transmission input torque on the basis of the torque information (engine rotary rate, fuel injection time and the like) from the engine control unit 88 (FIG. 1), a basic secondary thrust calculator 90b to calculate a basic secondary thrust (belt clamp force necessary for the secondary pulley 43) from the transmission input torque obtained by the input torque calculator 90a, a transmission required thrust difference calculator 90c to calculate a thrust difference required for transmission (a difference in belt clamp force between the primary and secondary pulleys 42, 43), a corrector 90d to correct the calculated basic secondary thrust on the basis of the required thrust difference for transmission, and a secondary hydraulic pressure converter 90e to covert the corrected secondary thrust to a target secondary hydraulic pressure. It further includes a basic primary thrust calculator 90f to calculate a basic primary thrust (belt clamp force required for the primary pulley 42) from the transmission input torque calculated by the input torque calculator 90a, a corrector 90g to correct the calculated basic primary thrust on the basis of the required thrust difference for transmission calculated by the transmission required thrust difference calculator 90c, and a primary hydraulic pressure converter 90h to convert the corrected primary thrust to a target primary hydraulic pressure.

The line pressure controller 91 includes a target line pressure determiner 91a to compare the target primary hydraulic pressure output from the primary hydraulic pressure converter 90h with the command secondary hydraulic pressure output from the secondary hydraulic pressure controller 92, and set the target line pressure to the target primary hydraulic pressure when the target primary hydraulic pressure≥the command secondary hydraulic pressure and set the target line pressure to the secondary hydraulic pressure when the target primary hydraulic pressure<the command secondary hydraulic pressure, and a hydraulic pressure-current converter 91b to convert the target line pressure determined by the target line pressure determiner 91a to a current value applied to the solenoid and output a command current value converted to the line pressure solenoid 72 of the regulator valve 71.

In the normal control the secondary hydraulic pressure controller 92 performs the feedback control using the actual secondary hydraulic pressure detected by the secondary hydraulic pressure sensor 82 to acquire a command secondary hydraulic pressure while in the belt slip control it performs open control without using the actual secondary hydraulic pressure to acquire the command secondary hydraulic pressure. It includes a low pass filter 92a through which the target secondary hydraulic pressure from the secondary hydraulic pressure converter 90e is filtered, a deviation calculator 92b to calculate a deviation between the actual secondary hydraulic pressure and the target secondary hydraulic pressure, a zero deviation setter 92c to set the deviation to zero, a deviation switch 92d to selectively switch between the calculated deviation and zero deviation, and an integrated gain determiner 92e to determine an integrated gain from oil temperature. Further, it includes a multiplier 92f to multiply the integrated gain from the integrated gain determiner 92e and the deviation from the deviation switch 92d, an integrator 92g to integrate an FB integrated control amount from the multiplier 92f, an adder 92h to add the integrated FB integrated control amount to the target secondary hydraulic pressure from the secondary hydraulic pressure converter 90e, and a limiter 92i to set upper and lower limits to the added value to obtain the command secondary hydraulic pressure (referred to basic secondary hydraulic pressure in the belt slip control). Further, it includes an oscillation adder 92j to add a sine wave oscillation command to the basic secondary hydraulic pressure in the belt slip control, a hydraulic pressure corrector 92k to correct the oscillated basic secondary hydraulic pressure by a secondary hydraulic pressure correction amount to the command secondary hydraulic pressure, and a hydraulic pressure-current converter 92m to convert the command secondary hydraulic pressure into a current value applied to the solenoid to output a command current value converted to the secondary hydraulic pressure solenoid 75. Note that the deviation switch 92d is configured to select the calculated deviation when a BSC operation flag is 0 (during the normal control) and select the zero deviation when the BSC operation flag is 1 (during the belt slip control).

The sine wave oscillation controller 93 oscillates the secondary hydraulic pressure by applying sine wave hydraulic pressure oscillation to the command secondary hydraulic pressure during the belt slip control. It includes a sine wave oscillator 93a to decide an oscillation frequency and an oscillation amplitude suitable for acquiring a phase difference between the oscillation component due to the oscillation included in the actual secondary hydraulic pressure and that included in the actual gear ratio and apply the sine wave hydraulic pressure oscillation in accordance with the decided frequency and amplitude, a zero oscillation setter 93b to apply no sine wave hydraulic pressure oscillation, and an oscillation switch 93c to selectively switch between the hydraulic pressure oscillation and zero oscillation. Note that the oscillation switch 93c is configured to select the zero oscillation when the BSC operation flag is 0 (during the normal control) and select the sine wave hydraulic pressure oscillation when the BSC operation flag is 1 (during the belt slip control).

During the belt slip control the secondary hydraulic pressure corrector 94 decreases the secondary hydraulic pressure on the basis of the phase difference between the oscillation component due to the oscillation included in the actual secondary hydraulic pressure and that included in the actual gear ratio. The secondary hydraulic pressure corrector 94 includes an actual gear ratio calculator 94a to calculate an actual gear ratio Ratio from a ratio of the primary rotary rate Npri of the primary rotation sensor 80 and the secondary rotary rate Nsec of the secondary rotation sensor 81, a first bandpass filter 94b to extract an oscillation component from a signal representing the actual secondary hydraulic pressure Psec obtained with the secondary hydraulic pressure sensor 82, and a second bandpass filter 94c to extract an oscillation component from the calculated data by the actual gear ratio calculator 94a. It further includes a multiplier 94d to multiply the oscillation components extracted by both bandpass filters 94b, 94c, a low pass filter 94e to extract phase difference information from the multiplication result, a secondary hydraulic pressure correction amount determiner 94f to determine a secondary hydraulic pressure correction amount on the basis of the phase difference information from the low pass filter 94e, a zero correction amount setter 94g to set the secondary hydraulic pressure correction amount to zero, and a correction amount switch 94h to selectively switch between the secondary hydraulic pressure correction amount and the zero correction amount. Note that the correction amount switch 94h is configured to select the zero correction amount when the BSC operation flag is 0 (during the normal control) and select the secondary hydraulic pressure correction amount when the BSC operation flag is 1 (during the belt slip control).

Figure 5:
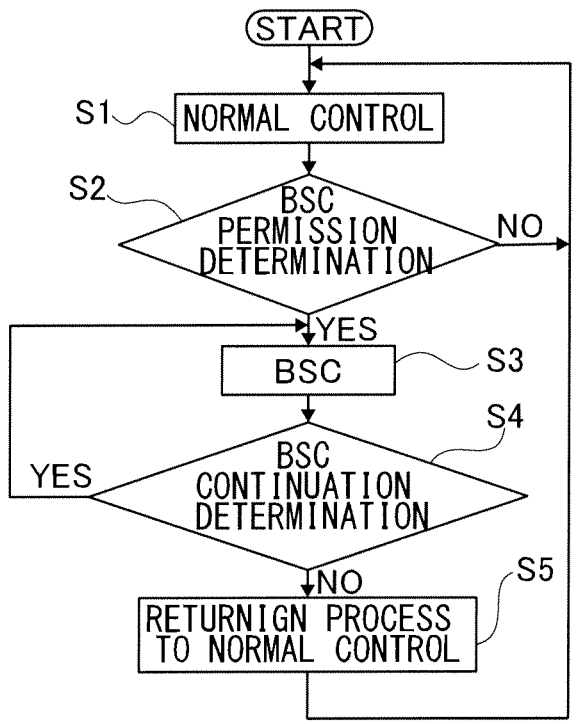
FIG. 5 is a flowchart for a basic switching process between the normal control and the belt slip control (=BSC) over the secondary hydraulic pressure executed by the CVT control unit 8 according to the first embodiment.

FIG. 5 is a basic flowchart for a switching process between the normal control and the belt slip control (=BSC) over the secondary hydraulic pressure executed by the CVT control unit 8 according to the first embodiment. In the following the respective steps in FIG. 5 are described.

In step S1 following a startup by turning-on of the key, the determination on non-BSC permission in step S2 or normal control returning process in step S5, the belt type continuously variable transmission mechanism 4 is normally controlled, and then the flow proceeds to step S2. During the normal control, the BSC operation flag is set to zero.

In step S2 following the normal control in step S1, a determination is made on whether or not all of the following BSC permission conditions are satisfied. At the result being YES (all the BSC permission conditions satisfied), the flow proceeding to step S3, the belt slip control (BSC) is performed. At the result being NO (any of the BSC permission conditions unsatisfied), the flow returning to step S1, the normal control is continued. An example of the BSC permission conditions is as follows:

(1) A change rate of the transmitted torque capacity of the belt type continuously variable transmission mechanism 4 is stable and small.

This condition (1) is determined by satisfaction of the following two conditions, for example.

a. |command torque change rate|<predetermined value
b. |command gear ratio change rate|<predetermined value Herein, the command torque change rate corresponds to the change speed of the input torque to the belt type continuously variable transmission 4. The condition that |command torque change rate|<predetermined value is satisfied not only by a driver's accelerator operation or the like but also by a forcible limit to vehicle acceleration based on satisfaction of the acceleration limit permitting condition.

(2) The estimated accuracy of the input torque to the primary pulley 42 is within a reliable range.

This condition (2) is for example determined on the basis of the torque information (estimated engine torque) from the engine control unit 88, the lockup state of the torque converter 2, the operation state of a brake pedal, a range position and the like.

(3) The permitted conditions in the above (1) (2) are continued for a predetermined length of time.

In step S2 whether or not the above conditions (1), (2), (3) are all satisfied is determined.

In step S3 following the BSC permission determination in step S2 or the BSC continuation determination in step S4, the belt slip control (FIG. 6 to FIG. 8) is performed to reduce an input to the belt 44 of the belt type continuously variable transmission mechanism 4 and maintain the belt 44 in a so-called micro slip state. Then, the flow proceeds to step S4. During the belt slip control the operation flag is set to 1.

In step S4 following the belt slip control in step S3, a determination is made on whether or not all of the following BSC continuation conditions are satisfied. At the result being YES (all the BSC continuation conditions satisfied), the flow returning to step S3, the belt slip control (BSC) is continued. At the result being NO (any of the BSC continuation conditions unsatisfied), the flow proceeds to step S5, and the normal control returning process is performed. An example of the BSC continuation conditions is as follows:

(1) A change rate of the transmitted torque capacity of the belt type continuously variable transmission mechanism 4 is small and stable.

This condition (1) is determined by satisfaction of the following two conditions, for example.

a. |command torque change rate|<predetermined value
b. |command gear ratio change rate|<predetermined value Herein, the condition that |command torque change rate|<predetermined value is satisfied not only by a driver's accelerator operation or the like but also by a forcible limitation to vehicle acceleration based on satisfaction of the acceleration limit permitting condition.

(2) The estimated accuracy of the input torque to the primary pulley 42 is within a reliable range.

This condition (2) is for example determined on the basis of the torque information (estimated engine torque) from the engine control unit 88, the lockup state of the torque converter 2, the operation state of a brake pedal, a range position and the like. Whether or not the above conditions (1), (2) are both satisfied is determined. That is, a difference between the BSC permission conditions and the BSC continuation conditions is in that the BSC continuation conditions exclude the continuation condition (3) of the BSC permission conditions.

In step S5 following a determination that any of the BSC continuation conditions is unsatisfied, the normal control returning process (FIG. 9 to FIG. 11) is performed to prevent the belt 4 from slipping when the belt slip control is returned to the normal control. Upon completion of the process, the flow returns to step S1 and shifts to the normal control.

Figure 6:
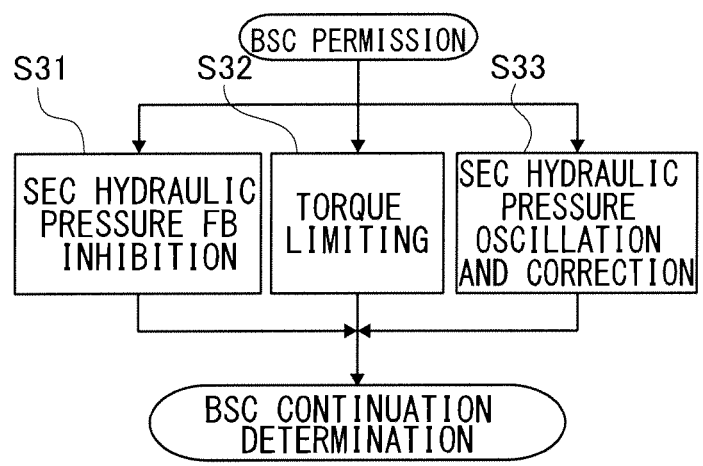
FIG. 6 is a flowchart for the entire belt slip control process executed by the CVT control unit 8 according to the first embodiment.
Figure 7:
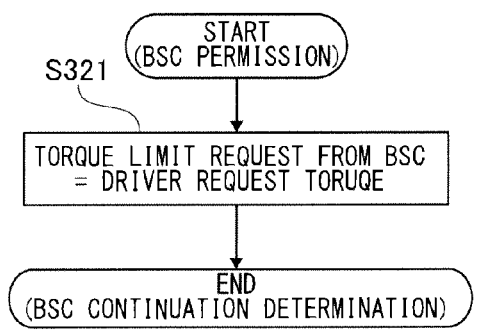
FIG. 7 is a flowchart for the torque limit process of the belt slip control process executed by the CVT control unit 8 according to the first embodiment.
Figure 8:
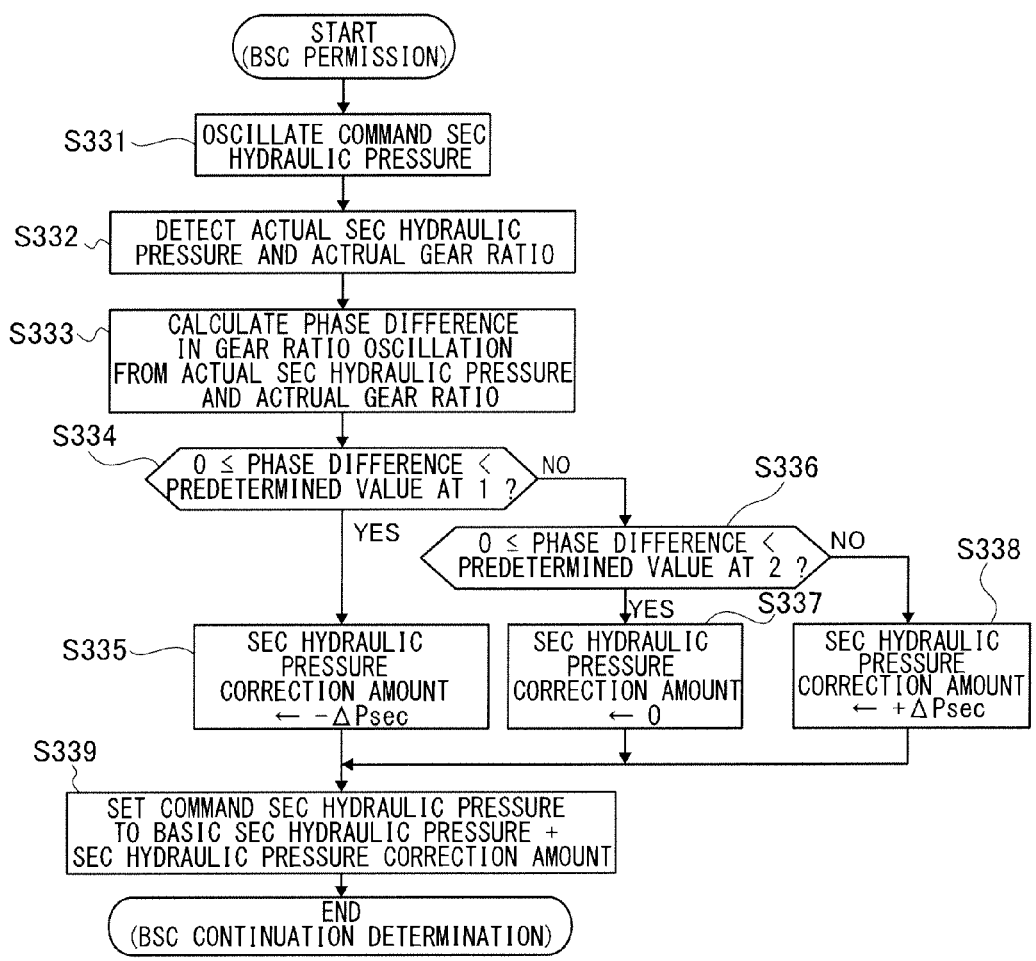
FIG. 8 is a flowchart for the secondary hydraulic pressure oscillation and correction process of the belt slip control process executed by the CVT control unit 8 according to the first embodiment.

FIG. 6 is a flowchart for the entire belt slip control process executed by the CVT control unit 8 according to the first embodiment. FIG. 7 is a flowchart for the torque limit process of the belt slip control process executed by the CVT control unit 8 according to the first embodiment. FIG. 8 is a flowchart for the secondary hydraulic pressure oscillation and correction process of the belt slip control process executed by the CVT control unit 8 according to the first embodiment.

First, as apparent from FIG. 6, during the belt slip control in which the BSC permission determination and the BSC continuation determination are continued, a feedback control inhibition process (step S31) in which the command secondary hydraulic pressure is obtained using the actual secondary hydraulic pressure, a torque limit process (step S32) as a preparation for returning to the normal control, and a secondary hydraulic pressure oscillation and correction process (step S331 for the belt slip control are concurrently performed.

In step S31 during the belt slip control in which the BSC permission determination and the BSC continuation determination are continued, the feedback control under which the command secondary hydraulic pressure is obtained using the actual secondary hydraulic pressure detected by the secondary hydraulic pressure sensor 82 is inhibited.

That is, the hydraulic pressure feedback control in the normal control is inhibited during the belt slip control since the actual secondary hydraulic pressure information contains the oscillation component due to the oscillation, and switched to a basic secondary hydraulic pressure control using a zero deviation. The hydraulic pressure feedback control is returned when the belt slip control is shifted to the normal control.

In step S32 during the belt slip control in which the BSC permission determination and the BSC continuation determination are continued, the torque limit process in FIG. 7 is performed. In step S321 of the flowchart in FIG. 7 a "torque limit request from the belt slip control" is defined to be the driver request torque.

In step S33 during the belt slip control in which the BSC permission determination and the BSC continuation determination are continued, the secondary hydraulic pressure is oscillated and corrected by feedback control using phase difference information in FIG. 8. In the following the steps of the flowchart in FIG. 8 are described.

In step S331 the command secondary hydraulic pressure is oscillated. That is, the sine wave hydraulic pressure with predetermined amplitude and predetermined frequency is superimposed on the command secondary hydraulic pressure. The flow proceeds to step S332.

In step S332 following the oscillation of the command secondary hydraulic pressure in step S331, the actual secondary hydraulic pressure is detected with the secondary hydraulic pressure sensor 82 to detect the actual gear ratio by calculation based on information on the rotary rates from the primary rotation sensor 80 and the secondary rotation sensor 81. The flow proceeds to step S333.

In step S333 following the detection of the actual secondary hydraulic pressure and the actual gear ratio in step S332, the actual secondary hydraulic pressure and the gear ratio are each subjected to the bandpass filter process to extract their respective oscillation components (sine wave) and multiply them. Then, the multiplied value is subjected to the low pass filter process and converted to a value expressed by amplitude and a phase difference θ (cosine wave) between the oscillation of the actual secondary hydraulic pressure and that of the actual gear ratio. The flow proceeds to step S334. Herein, where A is the amplitude of the actual secondary hydraulic pressure and B is the amplitude of the actual gear ratio, the oscillation of the actual secondary hydraulic pressure is expressed by the formula (1): A sin ωt. The oscillation of the actual gear ratio is expressed by the formula (2): B sin (ωt+θ). The formulas (1) and (2) are multiplied, and using the following product sum formula (3):

$$\sin \alpha \sin \beta = -\tfrac{1}{2}\{\cos(\alpha+\beta)-\cos(\alpha-\beta)\}$$

the following formula (4):

$$A \sin \omega t \times B \sin(\omega t+\theta) = (\tfrac{1}{2})AB \cos \theta - (\tfrac{1}{2})AB \cos(2\omega t+\theta)$$

is obtained.

In the formula (4), (½)AB cos(2ωt+θ) as the double component of the oscillation frequency is reduced through the low pass filter so that the formula (4) becomes the following formula (5):

$$A \sin \omega t \times B \sin(\omega t+\theta) \approx (\tfrac{1}{2})Ab \cos \theta$$

That is, the multiplied value of the oscillation components included in the actual secondary hydraulic pressure and the actual gear ratio is subjected to low pass filtering and converted to a value of the amplitudes A, B (constant) multiplied by cos θ (cosine of a phase difference θ). The converted value can be used for control information signifying a phase difference θ in oscillation between the actual secondary hydraulic pressure and the actual gear ratio (hereinafter, simply phase difference θ).

In step S334 following the calculation of the phase difference θ in the oscillation between the actual secondary hydraulic pressure and the actual gear ratio, a determination is made on whether or not the phase difference θ is such that 0≤phase difference θ<predetermined value at 1 (micro slip range). At the result being YES (0≤phase difference θ<predetermined value at 1), the flow proceeds to step S335 while at the result being NO (predetermined value at 1≤phase difference θ), the flow proceeds to step S336.

In step S335 following the determination on 0≤phase difference θ<predetermined value at 1 (micro slip range) in step S334, the secondary hydraulic pressure correction amount is set to −ΔPsec. The flow proceeds to step S339.

In step S336 following the determination on the predetermined value at 1≤phase difference θ in step S334, a determination is made on whether or not the phase difference θ is such that predetermined value at 1≤phase difference θ<predetermined value at 2 (a phase difference range in which the belt slip rate falls in a target "micro slip" range). At the result being YES (predetermined value at 1≤phase difference θ<predetermined value at 2), the flow proceeds to step S337 while at the result being NO (predetermined value at 2≤phase difference θ), the flow proceeds to step S338.

In step S337 following the determination on predetermined value at 1≤phase difference θ<predetermined value at 2 (target slip range) in step S336, the secondary hydraulic pressure correction amount is set to zero and the flow proceeds to step S339.

In step S338 following the determination on predetermined value at 2≤phase difference θ (micro/macro slip transition range) in step S336, the secondary hydraulic pressure correction amount is set to +ΔPsec and the flow proceeds to step S339.

In step S339 following the setting of the secondary hydraulic pressure correction amounts in steps S335, S337, S338, the command secondary hydraulic pressure is set to the value of the basic secondary hydraulic pressure+secondary hydraulic pressure correction amount. Then, the flow ends.

Figure 9:
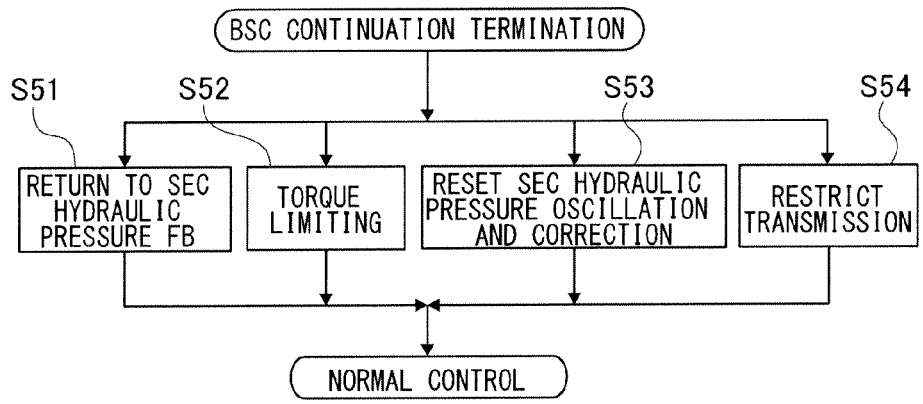
FIG. 9 is a flowchart for a returning process from the belt slip control to the normal control executed by the CVT control unit 8 according to the first embodiment.
Figure 10:
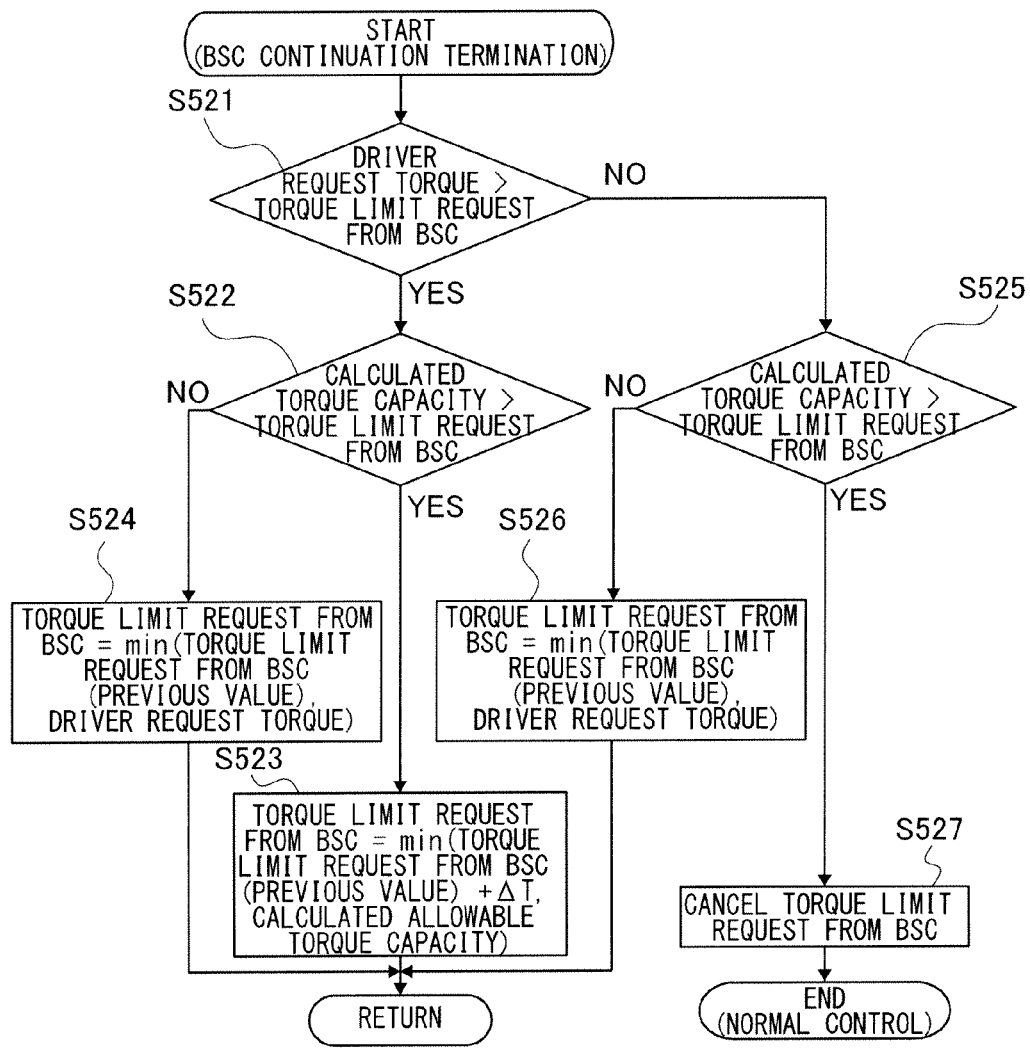
FIG. 10 is a flowchart for the torque limit process of the returning process to the normal control executed by the CVT control unit 8 according to the first embodiment.
Figure 11:
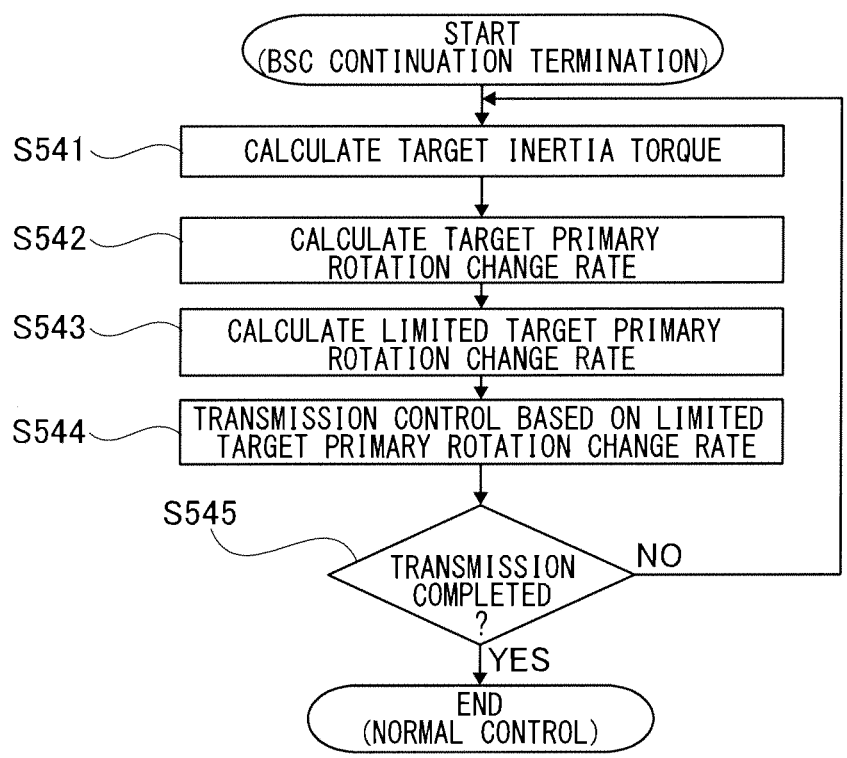
FIG. 11 is a flowchart for limiting process for the transmission speed of a gear ratio to limit a target primary rotary rate in the returning process to the normal control executed by the CVT control unit 8 according to the first embodiment.

FIG. 9 is a flowchart for a returning process from the belt slip control to the normal control executed by the CVT control unit 8 according to the first embodiment. FIG. 10 is a flowchart for the torque limit process of the returning process to the normal control executed by the CVT control unit 8 according to the first embodiment. FIG. 11 is a flowchart for transmission speed limiting process in the returning process to the normal control executed by the CVT control unit 8 according to the first embodiment.

First, as apparent from FIG. 9, while the normal control is returned from the belt slip control from the BSC continuation termination to the start of the normal control, a feedback control returning process (step S51) in which the command secondary hydraulic pressure is obtained using the actual secondary hydraulic pressure, a torque limit process (step S52) as a preparation for returning to the normal control, an oscillation and correction secondary hydraulic pressure resetting process (step S53) for the belt slip control, and a transmission restricting process (step S54) in which the transmission speed is restricted are concurrently performed.

In step S51, while the normal control is returned from the belt slip control from the BSC continuation termination to the start of the normal control, the feedback control in which the command secondary hydraulic pressure is obtained using the actual secondary hydraulic pressure detected by the secondary hydraulic pressure sensor 82 is returned.

In step S52 while the normal control is returned from the belt slip control from the BSC continuation termination to the start of the normal control, the torque limit process as a preparation for returning to the normal control in FIG. 10 is performed.

In step S53 while the normal control is returned from the belt slip control from the BSC continuation termination to the start of the normal control, the secondary hydraulic pressure oscillation and correction in FIG. 8 is reset to wait for the normal control.

In step S54 while the normal control is returned from the belt slip control from the BSC continuation termination to the start of the normal control, the transmission restricting process in which the transmission speed is restricted in FIG. 11 is performed.

In the following the steps of the flowchart showing the torque limit process in FIG. 10 are described. The key point of this torque limit process is to switch the controls on the basis of a magnitude relation among the three values of driver request torque, torque limit request from the BSC, and torque capacity (calculated torque capacity). Herein, the driver request torque refers to an engine torque requested by a driver, torque limit request from the BSC refers to torque limit amount shown in the phases (2), (3) in FIG. 20. Torque capacity is generally an allowable designed torque capacity and set to a value higher than the driver request torque by a margin with mechanical variation of the belt type continuously variable transmission mechanism 4 taken into consideration, for the purpose of preventing the belt slip. Herein, the actual torque capacity is controlled under the secondary hydraulic pressure control. Further the calculated torque capacity refers to a torque capacity during the returning process (phase (3) in FIG. 20) of the BSC (phase (2) in FIG. 20).

The calculated torque capacity is specifically a value based on or calculated from the actual secondary hydraulic pressure and the actual gear ratio (torque capacity of one of the two pulleys 42, 43 to which engine torque is input, that is, the primary pulley 42).

In step S521 a determination is made on whether or not the driver request torque is larger than the torque limit request from the BSC. At the result being YES, the flow proceeds to step S522 while at the result being NO, the flow proceeds to step S525.

In step S522 following the determination on the driver request torque is larger than the torque limit request from the BSC in step S521, a determination is made on whether or not the calculated torque capacity is larger than the torque limit request from the BSC. At the result being YES, the flow proceeds to step S523 while at the result being NO, the flow proceeds to step S524.

In step S523 following the determination on the calculated torque capacity>the torque limit request from the BSC in step S522, the torque limit request from the BSC is set to a smaller one of the torque limit request from the BSC (previous value)+ΔT and the calculated allowable torque capacity. The flow proceeds to RETURN.

In step S524 following the determination on the calculated torque capacity≤the torque limit request from the BSC in step S522, the torque limit request from the BSC is set to a smaller one of the torque limit request from the BSC (previous value) and the driver request torque. The flow proceeds to RETURN.

In step S525 following the determination on the driver request torque≤the torque limit request from the BSC in step S521, a determination is made on whether or not the calculated torque capacity is larger than the torque limit request from the BSC. At the result being YES, the flow proceeds to step S527 while at the result being NO, the flow proceeds to step S526.

In step S526 following the determination on the calculated torque capacity≤the torque limit request from the BSC in step S525, the torque limit request from the BSC is set to a smaller one of the torque limit request from the BSC (previous value) and the driver request torque. The flow proceeds to RETURN.

In step S527 following the determination on the calculated torque capacity>the torque limit request from the BSC in step S525, the torque limit request from the BSC is cancelled. The flow ends.

In the following the steps of the flowchart showing the limiting process for the transmission speed of a gear ratio to limit a target primary rotary rate in FIG. 11 are described.

In step S541 a target inertia torque is calculated. The flow proceeds to step S542.

In step S542 following the calculation of the target inertia torque in step S541, a target primary rotation change rate is calculated from the target inertia torque. Then, the flow proceeds to step S543.

In step S543 following the calculation of the target primary rotation change rate in step S542, a limited target primary rotary rate not exceeding the target primary rotation change rate is calculated, and the flow proceeds to step S544.

In step S544 following the calculation of the limited target primary rotation change rate in step S543, the transmission control is performed on the basis of the limited target primary rotary rate, and the flow proceeds to step S545.

In step S545 following the transmission control in step S544, a determination is made on whether or not the transmission control based on the limited target primary rotary rate is completed or the actual primary rotary rate has reached the limited target primary rotary rate. At the result being YES (completion of transmission control), the flow ends while at the result being NO (in the middle of transmission control), and the flow returns to step S541.

Figure 12:
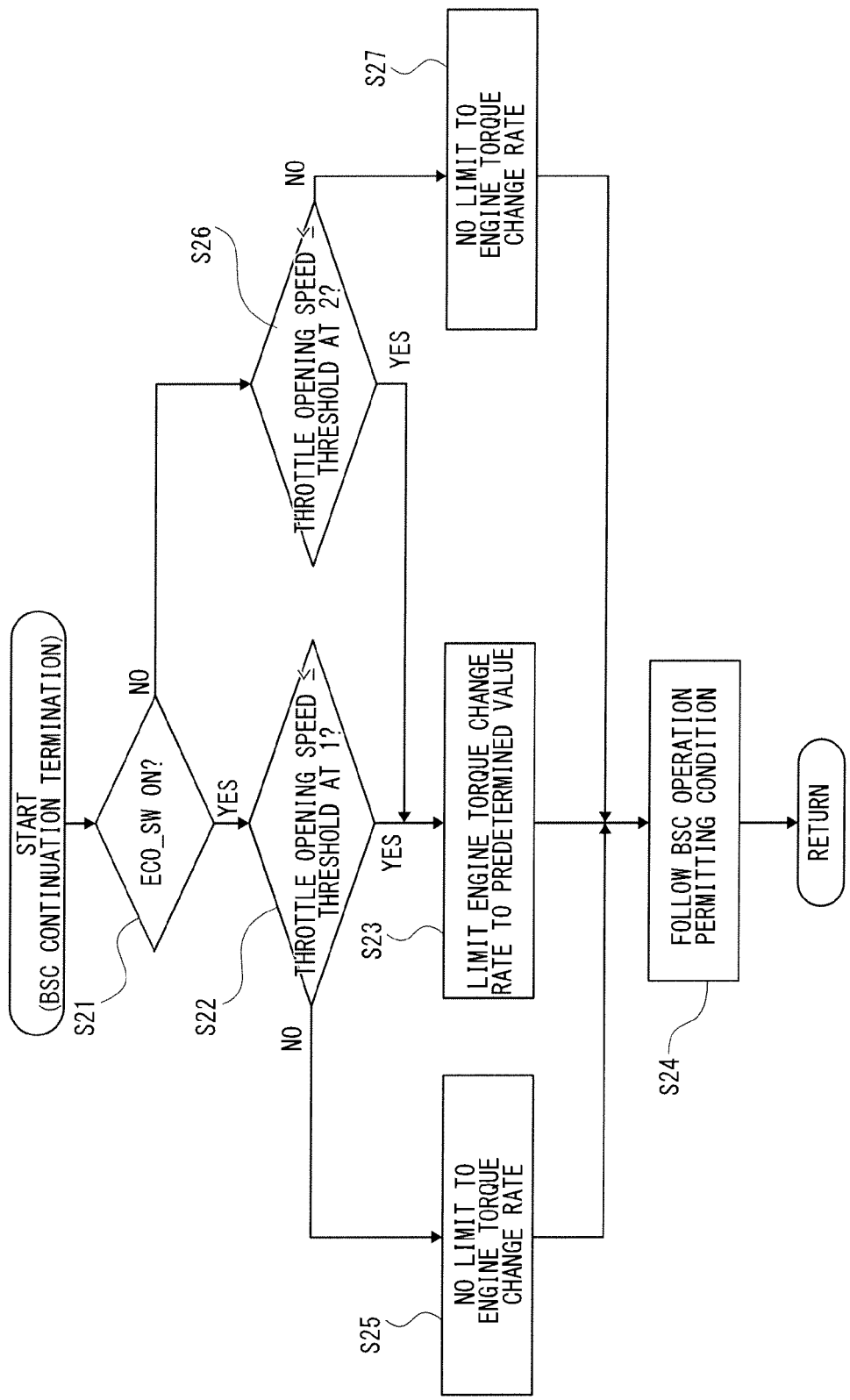
FIG. 12 is a flowchart for the entire BSC permission determining process executed by the CVT control unit 8 according to the first embodiment.
Figure 13:
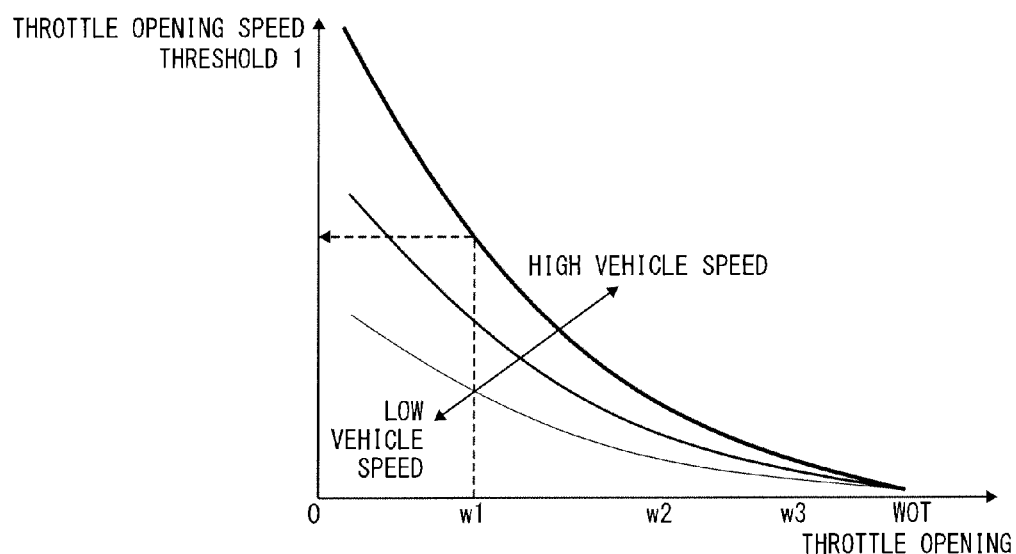
FIG. 13 shows a threshold characteristic as a threshold 1 for throttle opening used when an ECO switch is turned on in the BSC permission determining process executed by the CVT control unit 8 according to the first embodiment.
Figure 14:
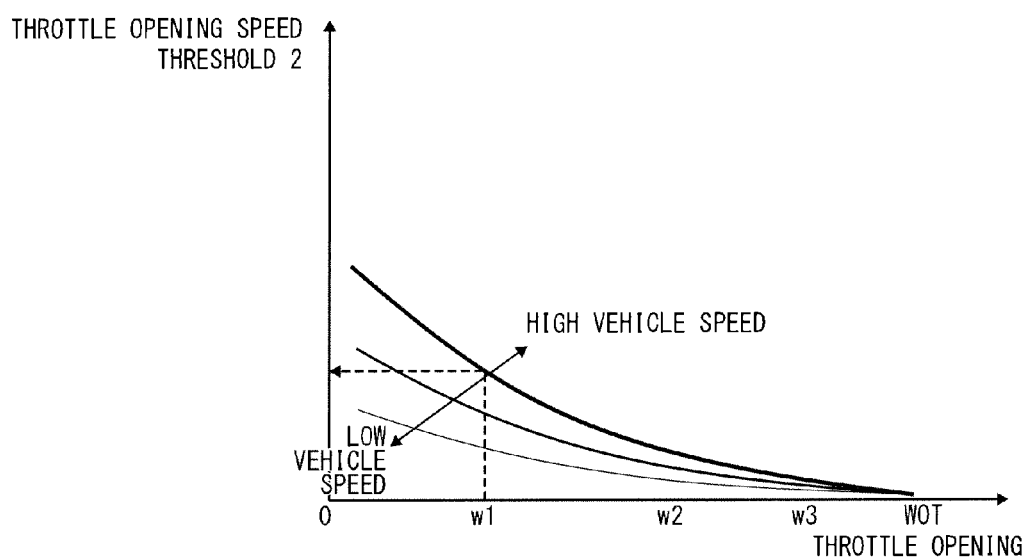
FIG. 14 shows a threshold characteristic as a threshold 2 for throttle opening used when an ECO switch is turned off in the BSC permission determining process executed by the CVT control unit 8 according to the first embodiment.

FIG. 12 is a flowchart for the entire BSC permission determining process executed by the CVT control unit 8 according to the first embodiment. FIG. 13 shows a threshold characteristic as a threshold 1 for throttle opening used when an ECO switch is turned on in the BSC permission determining process executed by the CVT control unit 8 according to the first embodiment. FIG. 14 shows a threshold characteristic as a threshold 2 for throttle opening used when an ECO switch is turned off in the BSC permission determining process executed by the CVT control unit 8 according to the first embodiment. In the following the BSC permission determining process is described with reference to FIG. 12 to FIG. 14.

In step S21 a determination is made on whether or not the ECO switch 89 is ON to allow the driver to select the normal drive mode or economical drive mode. At the result being YES (economical drive mode selected), the flow proceeds to step S22 and at the result being NO (normal drive mode selected), the flow proceeds to step S26 (limit determining means). The on-state of the ECO switch 89 is one of predetermined acceleration limit permitting conditions and indicates a driver's selection of the economical drive mode, aiming for improving fuel economy.

In step S22 following that the economical drive mode is selected in step S21, a determination is made on whether or not the throttle opening speed is a threshold 1 or less. At the result being YES (throttle opening speed≤threshold 1), the flow proceeds to step S23 while at the result being NO (throttle opening speed>threshold 1), the flow proceeds to step S25 (limit determining means). That throttle opening speed≤threshold 1 is one of predetermined acceleration limit permitting conditions and indicates that the driver operates the accelerator without aiming for a great acceleration request during the economical drive mode. The throttle opening speed is found by differential operation of a detected throttle opening from the throttle opening sensor 87 with time. The threshold 1 has characteristics as shown in FIG. 13, remains high while the throttle opening is low and the higher the throttle opening, the lower the threshold 1, and remains low while the vehicle speed is high and the lower the vehicle speed, the lower the threshold 1. During the economical drive mode, to prioritize fuel economy to the driver's acceleration request, the range, throttle opening speed≤threshold 1 is set to be larger than the range of threshold characteristic in FIG. 14, throttle opening speed≤threshold 2. In FIG. 13 the higher the throttle opening, the lower the threshold 1 because a driver highly demands for the acceleration when pressing down the accelerator at the high throttle opening. Also, the lower the vehicle speed, the lower the throttle opening 1 because a driver highly demands for the acceleration when pressing down the accelerator at a low vehicle speed.

In step S23 following that throttle opening speed≤threshold 1 is determined in step S22, the engine torque change rate is limited to the predetermined value and the flow proceeds to step S24 (input torque change speed limiting means).

Herein, the limitation of the engine torque change rate to the predetermined value means the limitation of a command engine torque change rate so that |command torque change rate|<predetermined value as BSC operation permitting condition (BSC permission and continuation conditions) is satisfied. That is, the predetermined value in step S23 is the same as the threshold for the |command torque change rate| in the BSC permission and continuation conditions in steps S2, S4.

In step S24 following limit or no limit to the engine torque change rate in step S23, S25 and S27, BSC permission or BSC continuation is determined according to the BSC operation permitting condition. Then, the flow ends.

In step S25 following that throttle opening speed>threshold 1 is determined, the engine torque change rate is not limited. The flow proceeds to step S24.

In step S26 following that the selection of the normal drive mode is determined in step S21, a determination is made on whether or not the throttle opening speed is threshold 2 or less. At the result being YES (throttle opening speed≤threshold 2), the flow proceeds to step S23. At the result being NO (throttle opening speed>threshold 2), the flow proceeds to step S27 (limit determining means). That throttle opening speed≤threshold 2 is one of the predetermined acceleration limit permitting conditions and indicates that the driver operates the accelerator without aiming for a great acceleration request during the normal drive mode. The throttle opening speed is found by differential operation of a detected throttle opening from the throttle opening sensor 87 with time. Similarly to the threshold 1, the threshold 2 has characteristics as shown in FIG. 14, remains high while the throttle opening is low and the higher the throttle opening, the lower the threshold 2, and remains high while the vehicle speed is high and the lower the vehicle speed, the lower the threshold 2. During the normal drive mode, to prioritize the driver's acceleration request to fuel economy, the range, throttle opening speed≤threshold 2 is set to be smaller than the range of threshold characteristic in FIG. 13, throttle opening speed≤threshold 1.

In step S27 following that throttle opening speed>threshold 2 is determined in step S26, the engine torque change rate is not limited. The flow proceeds to step S24.

Next, the control and operation of the belt type continuously variable transmission mechanism 4 according to the first embodiment is described. It will be divided into six parts, normal control and belt slip control, BSC permission and continuation determining operations, BSC permission and continuation determining operations by |command torque change rate|<predetermined value, operation range expanding operation in which the belt slip control is permitted, belt slip control (BSC operation), and returning control operation from the BSC to the normal control.

[Normal Control and Belt Slip Control]

The belt type continuously variable transmission 4 according to the first embodiment is configured to control primary and secondary hydraulic pressures. The normal control refers to control over the belt 44 wound around the pulleys 42, 43 not to slip while the belt slip control refers to control over the belt 44 to intentionally slip at a predetermined slip rate. In the following the essential terms, normal control and belt slip control and the reason for adopting a phase difference feedback control are described.

In the normal control the primary and secondary hydraulic pressures are controlled to generate belt clamp force (=belt thrust) sufficient to certainly prevent the belt 44 from slipping even with a fluctuation in input torque from the engine 1 as a driving source. During the normal control the actual secondary hydraulic pressure from the secondary hydraulic pressure sensor 82 is controlled by hydraulic pressure feedback control (PI control) to be a target hydraulic pressure calculated in the basic hydraulic pressure calculator 90 on the basis of input torque or required thrust difference at transmission (FIG. 4).

Meanwhile, in the belt slip control the secondary hydraulic pressure is controlled to maintain the so-called micro-slip of the belt 44 by lowering the belt clamp force from that in the normal control under the same driving condition. In the belt slip control the secondary hydraulic pressure is oscillated to extract an oscillation component included in the actual secondary hydraulic pressure and that included in the actual gear ratio due to the oscillation and adjust a phase difference θ in the extracted oscillation components to fall within a target range (predetermined value 1≤phase difference<predetermined value 2) by phase difference feedback control (FIG. 8).

The reason for adopting the phase difference feedback control in the belt slip control is that while no belt slip is occurring with no change in the contact positions of the secondary pulley 43 and the belt 44, the extracted oscillation components in the actual secondary hydraulic pressure and the actual gear ratio are in synchronous wave forms at the same phase. However, when a bet slip occurs due to a change in the contact positions of the secondary pulley 43 and the belt 44, the phase difference in the oscillation waveforms becomes larger in proportion to an increase in the belt slip rate. In other words the phase difference and the belt slip rate are closely correlated with each other so that using phase difference information to estimate the belt slip rate, the belt slip control is feasible with high accuracy to slip the belt 44 in the micro slip range without directly detecting the belt slip rate.

In addition, the phase difference information is acquired from actual gear ratio information from the primary and secondary rotation sensors 80, 81 and actual secondary hydraulic pressure information from the secondary hydraulic pressure sensor 82. This eliminates the necessity for adding a new sensor for acquiring slip rate information in the belt slip control. The belt slip control is performed using the existing sensors 80, 81, 82 for the normal control of the belt type continuously variable transmission 4.

However, if the basic component of the actual secondary hydraulic pressure is found using a deviation calculated from the actual secondary hydraulic pressure information containing the oscillation component from the secondary hydraulic pressure sensor 82, the secondary hydraulic pressure cannot be stably controlled due to a fluctuation in the calculated deviation caused by the oscillation. Because of this, in the belt slip control the basic component of the actual secondary hydraulic pressure is found by zero deviation.

[BSC Permission and Continuation Determining Operations]

At a start of the vehicle's running, the flow proceeds to step S2 from step S1 in the flowchart in FIG. 5. Unless all the BSC permission determining conditions are satisfied in step S2, the flow from step S1 to step S2 is repeated to continue the normal control. That is, the satisfaction of all the BSC permission determining conditions in step S2 is defined to be BSC control starting condition.

The BSC permission conditions in the first embodiment are as follows:

(1) A change rate of the transmitted torque capacity of the belt type continuously variable transmission mechanism 4 is stable and small.

(2) The estimated accuracy of the input torque to the primary pulley 42 is within a reliable range.

(3) The permitted conditions in the above (1) (2) are continued for a predetermined length of time. In step S2 whether or not the above conditions (1), (2), (3) are all satisfied is determined.

Thus, the belt slip control is allowed to start if a change rate of the transmitted torque capacity of the belt type continuously variable transmission mechanism 4 continues to be stably small and the estimated accuracy of the input torque to the primary pulley 42 is continuously within a reliable range for a predetermined length of time during the normal control. As above, the belt slip control is permitted to start upon the satisfaction of all the BSC permission conditions so that it is able to start the belt slip control in a preferable vehicle driving condition with an assured high control precision.

After the BSC permission is determined in step S2, in step S3 the belt slip control is performed to reduce an input to the belt 44 of the belt type continuously variable transmission mechanism 4 and maintain the belt 44 in a target micro-slip state. Then, in step S4 following the belt slip control in step S3, a determination is made on whether or not all of the BSC continuation conditions are satisfied. As long as all of the BSC continuation conditions are satisfied, the flow from step S3 to step S4 is repeated to continue the belt slip control (BSC).

Here, the BSC continuation conditions are the BSC permission conditions (1), (2) and exclude the continuation condition for a predetermined length of time (3) of the BSC permission conditions. This is because the belt slip control is immediately stopped and returned to the normal control if one of the conditions (1), (2) is unsatisfied during the belt slip control. Accordingly, it is made possible to prevent the belt slip control from continuing in a vehicle driving condition with uncertain control precision.

[BSC Permission and Continuation Determining Operations by |Command Torque Change Rate|<Predetermined Value]

In the belt slip control permission determination according to the first embodiment, the belt slip control is permitted under one of the conditions (1) that a command torque change rate indicating an input torque change speed to the belt type continuously variable transmission 4 is less than the predetermined value.

Figure 15:
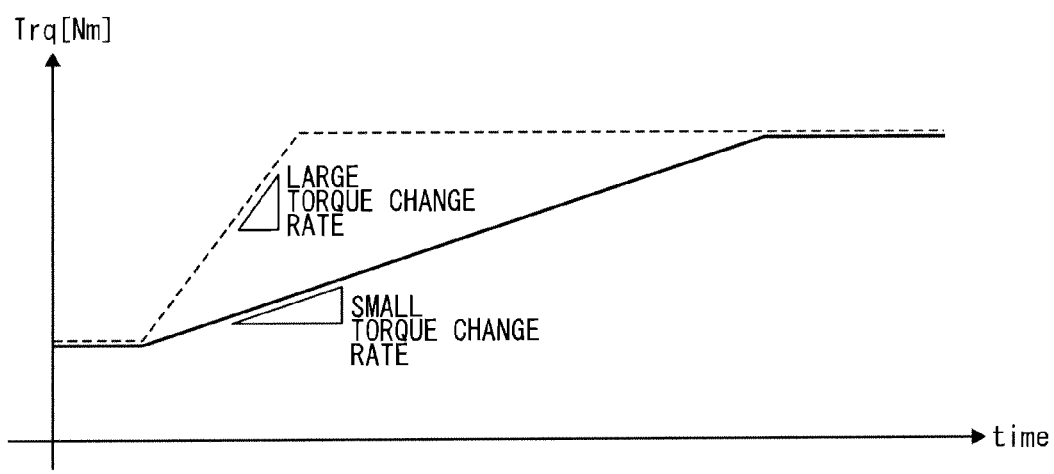
FIG. 15 is a timing chart illustrating a transmission input torque characteristic (clotted line) which is a torque input to the belt type continuously variable transmission in the belt slip control and when the torque change rate is large and a transmission input torque characteristic (solid line) which is a torque input to the belt type continuously variable transmission in the belt slip control and when the torque change rate is small.

Specifically, at a small input torque change rate (input torque change speed) to the belt type continuously variable transmission mechanism 4 as the solid line characteristic in FIG. 15, the oscillation component due to the oscillation remains in an actual secondary hydraulic pressure characteristic so it can be separated from the basic component of the actual secondary hydraulic pressure which fluctuates by a change in the input torque. Thus, the belt slip condition can be estimated with high accuracy by monitoring a phase difference in the oscillation components of the actual secondary hydraulic pressure.

Figure 16:
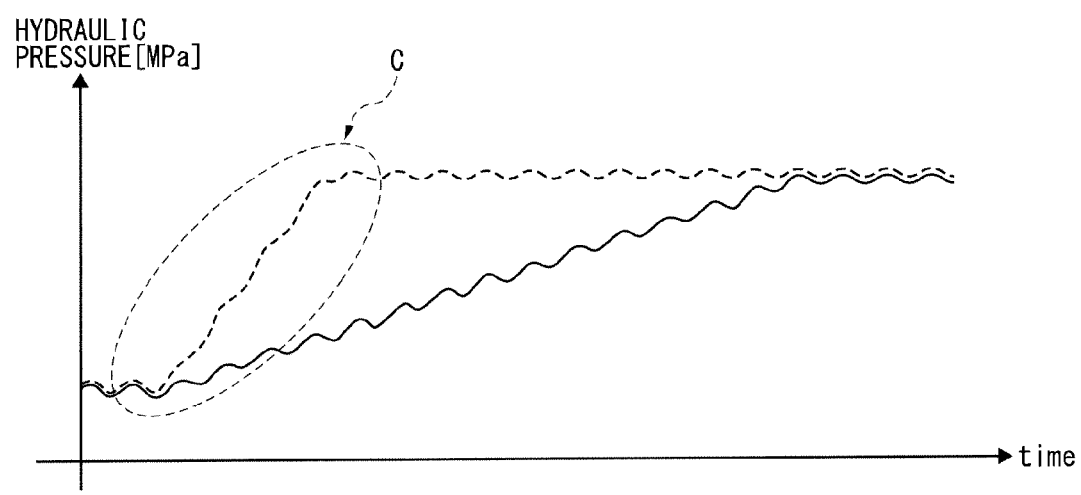
FIG. 16 is a timing chart illustrating an actual secondary hydraulic pressure characteristic (dotted line) when the torque change rate of the transmission input torque is large in the belt slip control and the actual secondary hydraulic pressure characteristic (solid line) when the torque change rate of the transmission input torque is small.

Meanwhile, at a large input torque change rate to the belt type continuously variable transmission mechanism 4 as the dotted line characteristic in FIG. 15, the oscillation component included in the actual secondary hydraulic pressure disappears as shown in the area C in FIG. 16 so it cannot be separated from the basic component of the actual secondary hydraulic pressure which fluctuates by a change in the input torque. Thus, the belt slip condition cannot be estimated with accuracy by monitoring a phase difference in the oscillation components of the actual secondary hydraulic pressure.

According to the first embodiment, however, the belt slip control is permitted when |command torque change rate|<predetermined value and the belt slip condition is estimated with high accuracy. Because of this, a reduction in the secondary hydraulic pressure reduces a belt friction, thereby lowering the driving load of the transmission. Accordingly, the in-use fuel economy of the engine 1 can be improved.

Meanwhile, the belt slip control is not permitted when |command torque change rate|≥predetermined value and the belt slip condition is not estimated with accuracy. Therefore, it is possible to prevent the belt from being placed in a macro slip state or largely slipped during the belt slip control, which would otherwise occur when the belt slip control is permitted with input torque condition not taken into account, for example. That is, the belt micro-slip state is maintained by reducing the secondary hydraulic pressure and the belt clamp force during the belt slip control from those during the normal control. An increase in the input torque to the belt type continuously variable transmission 4 in this state may cause the belt 44 supported with low clamp force to be greatly slipped as macro slip.

Relative to the BSC permission condition, |command torque change rate|<predetermined value, the predetermined value as a threshold for determining the magnitude of the command torque change rate is set to a value which allows the extraction of the oscillation component included in the secondary hydraulic pressure. For example, the predetermined value is set to a value obtained by subtracting a margin of variation in product quality from an upper limit input torque change rate which is determined to be a limit to be able to extract the oscillation component in the actual secondary hydraulic pressure while gradually increasing the input torque change rate to the belt type continuously variable transmission 4.

The belt slip control system is configured that the sine wave oscillation controller 93 in FIG. 4 superimposes a sine wave hydraulic pressure oscillation to the command secondary hydraulic pressure for oscillation, to estimate a belt slip condition using the oscillation components due to the oscillation included in the actual secondary hydraulic pressure and in the gear ratio Ratio. In other words, extracting the oscillation component due to the oscillation from the actual secondary hydraulic pressure is an essential condition for the execution of the belt slip control with the estimated accuracy of the belt slip condition maintained.

Thus, under the belt slip control permission determining condition that |command torque change rate|<predetermined value, it is possible to maintain the estimated accuracy of the belt slip condition on the basis of the two extracted oscillation components. In addition, it is made possible to expand the operation range under which the belt slip control permitting condition on the input torque change rate is satisfied, by allowing an increase in the input torque change rate to be in a limit range to be able to extract the oscillation component in the actual secondary hydraulic pressure, compared with the belt slip control permitted only under a condition that the input torque change rate is constant.

The first embodiment is configured that the belt slip control is permitted not on the basis of the torque change rate actually input to the belt type continuously variable transmission 4 but when the command torque change rate as a control command is less than the predetermined value. Therefore, the belt slip control start and continuation are determined at the time when a target input torque is found by operation to calculate the command input torque change rate from a current input torque and the target input torque. Accordingly, the belt slip control start and continuation can be determined on the basis of prognostic information as the command torque change rate before the torque change rate input to the belt type continuously variable transmission 4 is actually changed.

[Operation Range Expanding Operation to Permit Belt Slip Control]

During vehicle running with the ECO switch 89's ON and the throttle opening speed at the threshold 1 or less, the flow in FIG. 12 proceeds to step S21, S22, S23 to S24. That is, economical drive mode selecting condition as the turning-on of the ECO switch 89 and throttle opening speed condition as throttle opening speed≤threshold 1 are both satisfied (YES in steps S21, S22) and a limit to acceleration of the vehicle is permitted under the acceleration limit permitting condition. Following this permission, in step S23 the engine torque change rate is limited to the predetermined value so as to satisfy |command torque change rate|<predetermined value and in step S24 the BSC permission and continuation to start and continue the belt slip control are determined in accordance with the BSC operation permitting condition.

During vehicle running with the ECO switch 89's ON and the throttle opening speed exceeding the threshold 1, the flow in FIG. 12 proceeds to step S21, S22, S25 to S24. That is, the economical drive mode selecting condition as the turning-on of the ECO switch 89 is satisfied (YES in step S21) but throttle opening speed condition as throttle opening speed>threshold 1 is not (No in step S22), so that vehicle acceleration based on an acceleration request is permitted. Following this permission, in step S25 the engine torque change rate is not limited and in step S24 basically, maintaining normal control and returning to normal control are determined in accordance with the BSC operation permitting condition.

During vehicle running with the ECO switch 89's OFF and the throttle opening speed equal to or below the threshold 2, the flow in FIG. 12 proceeds to step S21, S26, S23 to S24. That is, even in the normal drive mode with the ECO switch 89 turned off, upon satisfaction of the condition that throttle opening speed≤threshold 2 (YES in step S26), the limit to vehicle acceleration is permitted. In step S23, following this permission, the engine torque change rate is limited to the predetermined value to satisfy |command torque change rate|<predetermined value. In step S24 the BSC permission and continuation to start and continue the belt slip control are determined in accordance with the BSC operation permitting condition.

During vehicle running with the ECO switch 89's OFF and the throttle opening speed equal exceeding the threshold 2, the flow in FIG. 12 proceeds to step S21, S26, S27 to S24. That is, the normal drive mode selecting condition is satisfied by the turning-off of the ECO switch 89 (YES in step S21) but the throttle opening speed condition as throttle opening speed>threshold 2 (NO in step S26) is not, so that vehicle acceleration based on an acceleration request is permitted. Following the permission, the engine torque change rate is not limited in step S27 and in step S24 basically, maintaining normal control and returning to normal control are determined in accordance with the BSC operation permitting condition.

As described above, in the belt slip control permission determination according to the first embodiment, one of the conditions for permitting the belt slip control is that the command torque change rate indicating the input torque change speed to the belt type continuously variable transmission 4 is less than the predetermined value. Moreover, the belt slip control is actively performed by forcibly limiting the engine torque change rate when the limit to the vehicle acceleration is determined as permissive according to the acceleration limit permitting condition.

Figure 17:
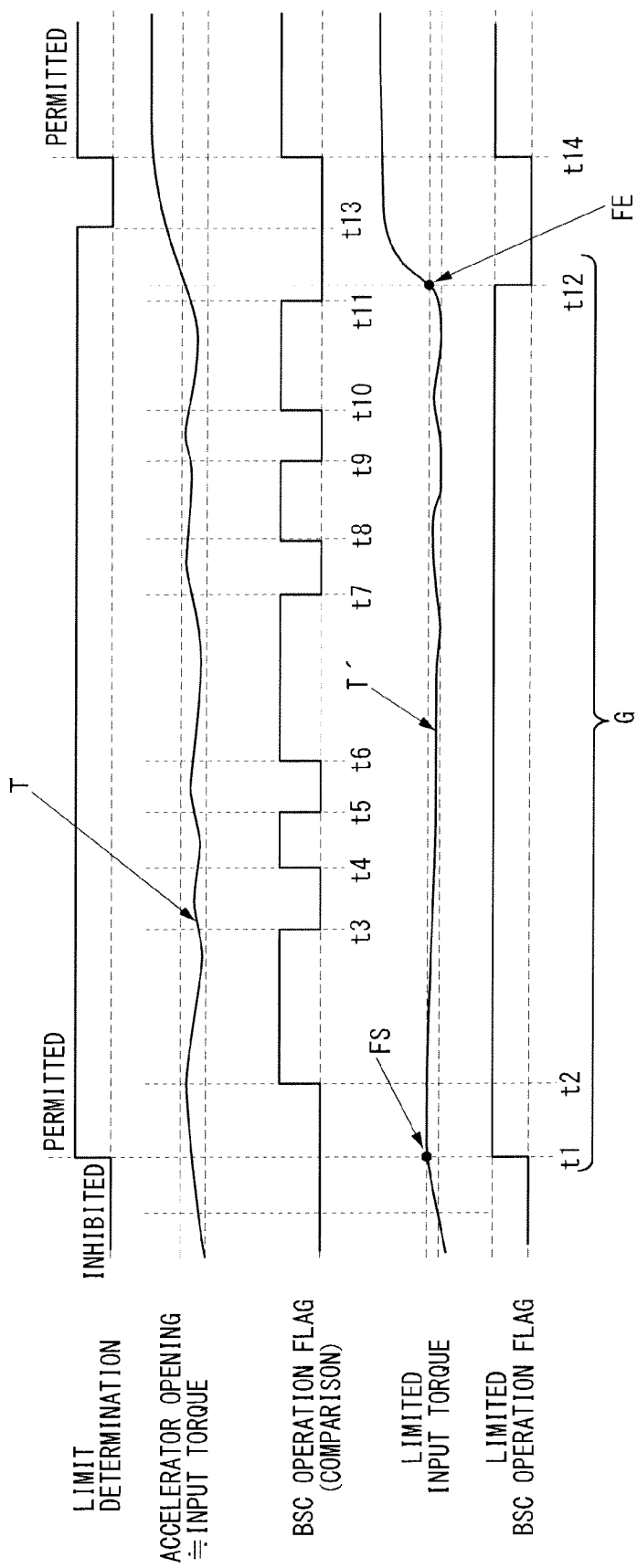
FIG. 17 is a timing chart for the respective characteristics of limit determination, accelerator opening (≈input torque), BSC operation flag (for comparison), limited input torque, and limited BSC operation flag when the input torque is fluctuated by a driver's slight change to the accelerator opening.
Figure 18:
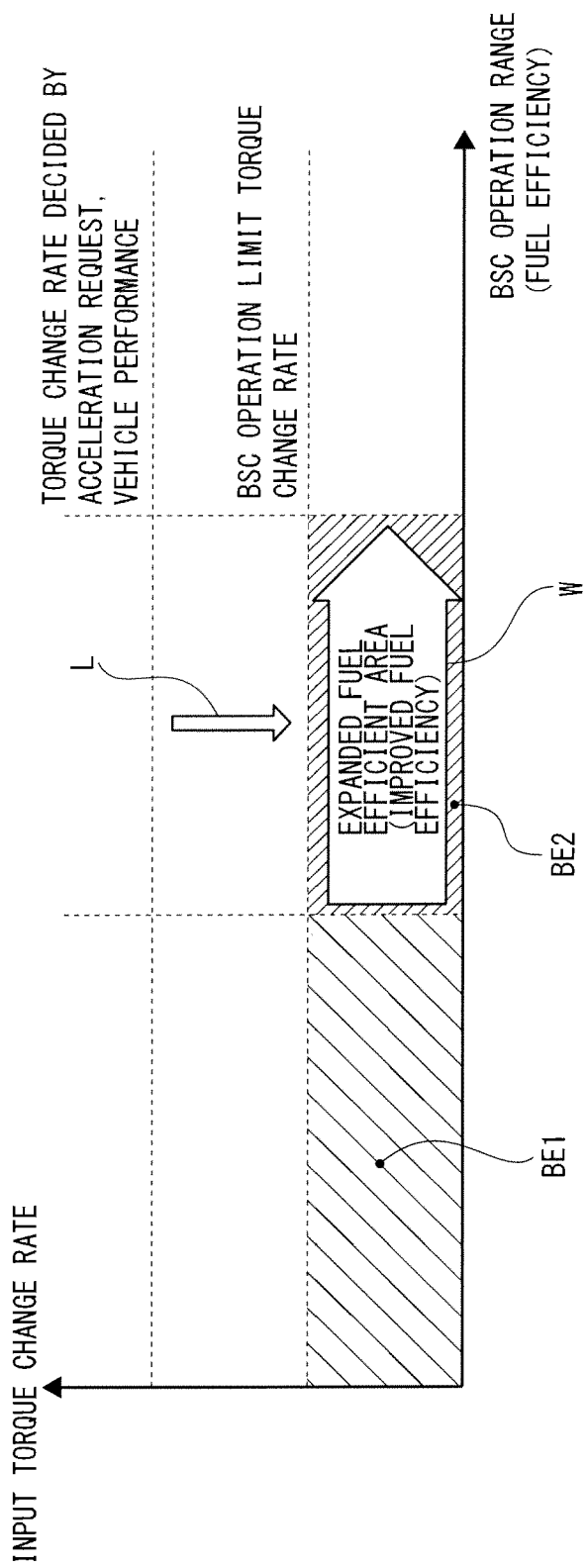
FIG. 18 is a graph showing the effects of an expanded BSC operation range according to the first embodiment in comparison with the input torque change rate not actively limited.

FIG. 17 is a timing chart for the characteristics of limit determination, accelerator opening (≈input torque), BSC operation flag (comparison), limited input torque, and limited BSC operation flag. FIG. 18 is a graph showing the effects of an expanded BSC operation range according to the first embodiment in comparison with a case where the input torque change rate is not actively limited. In the following the operation range expanding operation to permit the belt slip control is described with FIGS. 17, 18.

First, the belt slip control aims to enhance the power transmission efficiency of the belt type continuously variable transmission 4 by reducing belt friction and friction loss, and improve the fuel economy of an engine vehicle or a hybrid vehicle. To improve fuel economy, it is important for realizing an effective belt slip control to expand the operation range in which the belt slip control is performed as much as possible.

For comparison, an example is shown where the only belt slip control permitting condition is such that the command torque change rate is set according to a driver's accelerator operation to be equal to or less than a predetermined value or less. While the input torque is being fluctuated by a driver's slight change to the accelerator opening or else as shown in the input torque characteristic T in FIG. 17, the BSC operation flag rises in small divided operation ranges at time t2 to t3, t4 to t5, t6 to t7, t8 to t9, t10 to t11, and after t13 and the belt slip control is performed in these periods. That is, in this example the operation range in which the condition that |command torque change rate|<predetermined value is satisfied is limited since whether or not to permit the belt slip control is passively determined depending on a driver's accelerator manipulation or a vehicle condition as vehicle speed. Especially, if a driver tends to slightly press down and release the accelerator repeatedly during constant-speed running, the operation range in which the belt slip control is performed will be very limited.

Meanwhile, in the first embodiment the engine torque change rate is forcibly limited upon satisfaction of the acceleration limit permitting condition. Thereby, the belt slip control is actively performed not depending on a driver's accelerator operation but upon satisfaction of the condition that |command torque change rate|≤predetermined value.

Specifically, while the input torque is being fluctuated by a driver's slight change to the accelerator opening or a slight change as shown in the input torque characteristic T in FIG. 17, at time t1 the engine torque change rate (=input torque change rate) is limited to the predetermined value to satisfy |command torque change rate|<predetermined value upon satisfaction of both of the acceleration limit permitting condition as the selection of the economical driving mode and the throttle opening speed condition as throttle opening speed≤threshold 1. Then, the BSC operation flag is set to start the belt slip control. While the acceleration limit permitting condition and throttle opening speed condition are both satisfied, the engine torque change rate is continuously limited with the BSC operation flag kept set. When at time t12 the throttle opening speed becomes larger than the threshold 1 and the throttle opening speed condition is unsatisfied, the limitation to the engine torque change rate is stopped with the BSC operation flag set off to end the belt slip control. As shown in the limited input torque characteristic T' in FIG. 17, the engine torque change rate (=input torque change rate) is continuously limited to maintain the belt slip control in the period G from the point FS at time t1 to the point FE at time t12.

Compared with this example, the period in which the belt slip control is performed according to the first embodiment is a sum of that in the example and the periods t1 to t2, t3 to t4, t5 to t6, t7 to t8, t9 to t10, and t11 to t12 during which |command gear ratio change rate|≤predetermined is unsatisfied.

That is, in FIG. 18 the BSC operation range is expanded as indicated by the arrow W by adding a BSC operation range BE2 in which the vehicle acceleration limit permitting condition is satisfied to a BSC operation range BE1 in the compared example. Further, the estimated accuracy of the belt slip condition can be maintained by limiting the target gear ratio change rate to less than a BSC operation limit torque change rate predetermined value) in the added BSC operation range BE2 from the torque change rate decided by an acceleration request and a vehicle performance, as indicated by the arrow L in FIG. 18.

Thus, in the driving condition such as the ECO switch 89's turning-on in which a limitation to vehicle acceleration is permitted, it is possible to improve fuel efficiency by forcibly limiting the input torque change rate to a BSC operable input torque change rate to actively perform the belt slip control and expand the BSC operation range.

[Belt Slip Control Operation (BSC Operation)]

At start of the belt slip control, the secondary hydraulic pressure is set to a value to acquire the clamp force not to cause belt slippage with estimated safety so that the condition that the phase difference θ is lower than the predetermined value 1 is satisfied. In the flowchart in FIG. 8 the flow from step S331→step S332→step S333→step S334→step S335 to step S339 is repeated and every time the flow is repeated, the command secondary hydraulic pressure is decreased in response to the correction by −Δpsec. Then, until the phase difference θ at 1 or more reaches the predetermined value at 2, the flow proceeds from step S331→step S332→step S333→step S334→step S336→step S337 to step S339 in FIG. 8 to maintain the command secondary hydraulic pressure. At the phase difference θ being the predetermined value at 2 or more, the flow proceeds from step S331→step S332→step S333→step S334→step S336→step S338 to step S339 to increase the command secondary hydraulic pressure in response to the correction by +Δpsec. Under the belt slip control the slip rate is maintained to be in a micro slip range by phase difference feedback control so that the phase difference θ falls within the range of the predetermined value 1 or more to less than the predetermined value 2.

The belt slip control is described with reference to the timing chart in FIG. 19. At time t1, the above BSC permission conditions (1), (2) are satisfied and continued (BSC permission condition (3)). From time t2 to time t3, at least one of the above BSC continuation conditions (1), (2) becomes unsatisfied, and the BSC operation flag and SEC pressure F/B inhibiting flag (secondary pressure feedback inhibiting flag) are set for the belt slip control. A little before time t3 the accelerator is pressed, so that at least one of the BSC continuation conditions becomes unsatisfied and the control to return to the normal control is performed from time t3 to time t4. After time t4, the normal control is performed.

Figure 19:
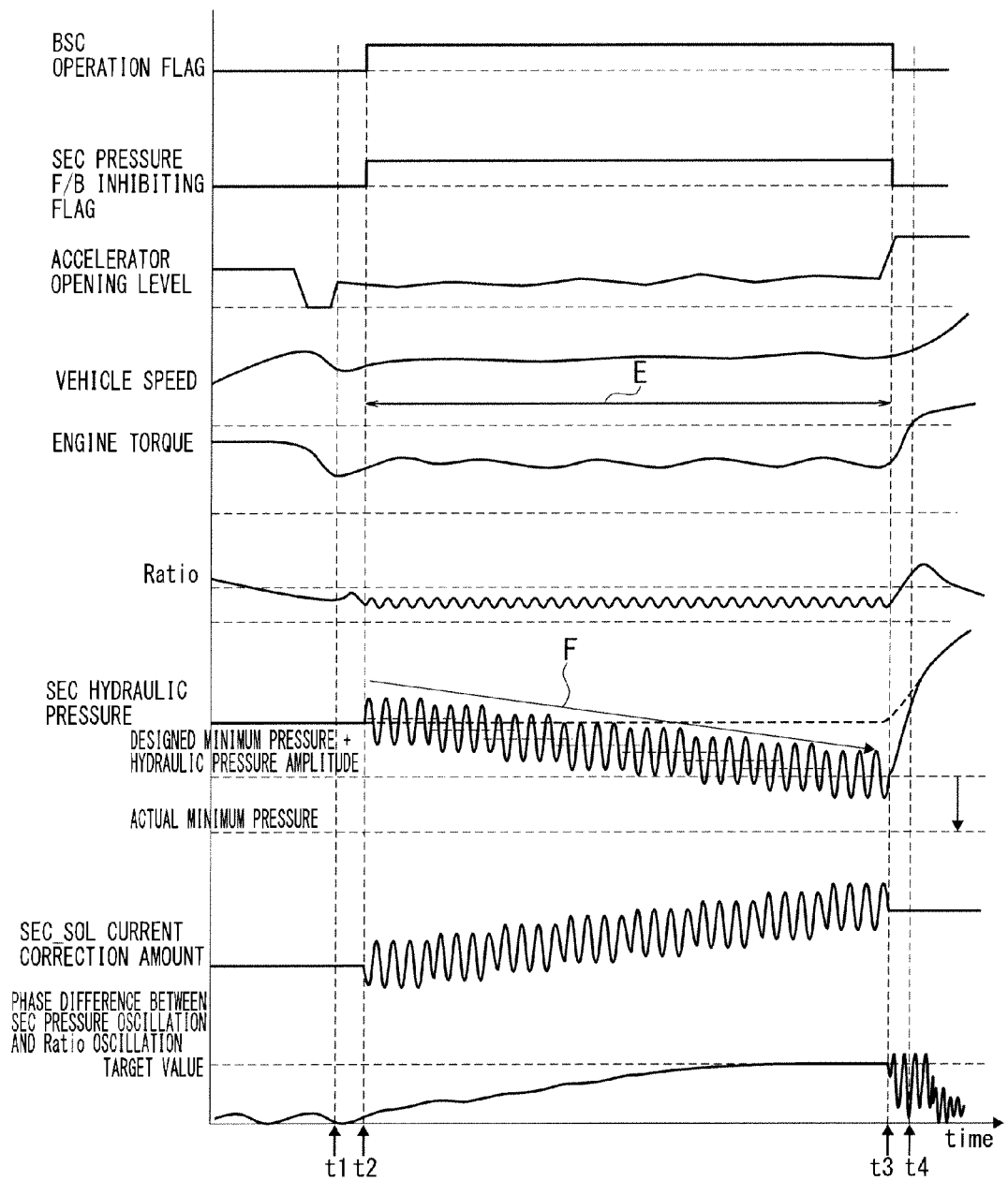
FIG. 19 is a timing chart of the respective characteristics of BSC operation flag, SEC pressure F/B inhibition flag, accelerator opening, vehicle speed, engine torque, Ratio, SEC hydraulic pressure, SEC_SOL current correction amount, and phase difference between SEC pressure oscillation and Ratio oscillation in a traveling scene during a control shift from the normal control, belt slip control, returning control to the normal control.

Thus, as apparent from the accelerator opening characteristic, vehicle speed characteristic, and engine torque characteristic as well as the solenoid current correction amount characteristic of the secondary hydraulic pressure solenoid 75 during steady running determination indicated by the arrow E in FIG. 19, under the belt slip control the phase difference θ between the oscillation components of the secondary hydraulic pressure due to the oscillation and the gear ratio is monitored to increase or decrease the current value. Note that the secondary hydraulic pressure solenoid 75 is normally open (always open) and decreases the secondary hydraulic pressure along with a rise of the current value.

The actual gear ratio is maintained to be virtually constant by the belt slip control although it fluctuates with small amplitude as shown in the actual gear ratio characteristic (Ratio) in FIG. 19. The phase difference θ, as shown in the phase difference characteristics of the SEC pressure oscillation and Ratio oscillation in FIG. 19, gradually increases with time from time t2 when the slip rate is approximately zero, and reaches a target value (target slip rate). The secondary hydraulic pressure as shown in the SEC hydraulic pressure characteristic in FIG. 19 decreases with time from time t2 when safety is secured, as indicated by the arrow F, and reaches a value of the designed minimum pressure added with hydraulic pressure amplitude in the end which is in the hydraulic pressure condition with a margin to the actual minimal pressure. While the belt slip control continues for a long time, the actual secondary hydraulic pressure is maintained in the amplitude range of the designed minimum pressure plus hydraulic pressure to maintain the target value of the phase difference θ (of slip rate).

Thus, a decrease in the secondary hydraulic pressure by the belt slip control results in reducing the belt friction acting on the belt 44 and reducing the drive load on the belt type continuously variable transmission mechanism 4 by the reduction in the belt friction. As a result, it is possible to improve the in-use fuel economy of the engine 1 without affecting the travelling performance during the belt slip control based on the BSC permission determination.

[Returning Control from BSC to Normal Control]

During the belt slip control while the BSC permission and continuation determinations are continued, the torque limit process in step S32 in FIG. 6 is performed by setting the "torque limit request from the belt slip control" as the driver request toque in step S321 in FIG. 7. In the following torque limit operation for retuning to the normal control is described with reference to FIG. 10 and FIG. 20.

The engine control unit 88 has a limit torque amount as an upper control limit engine torque, and controls the actual torque of the engine 1 not to exceed the limit torque amount. This limit torque amount is determined according to various requests. For example, the upper limit input torque to the belt type continuously variable transmission mechanism 4 is set to the torque limit request during the normal control (phase (1) in FIG. 20), and the CVT control unit 8 sends the torque limit request during the normal control to the engine control unit 88. The engine control unit 88 selects the minimum one of torque limit requests from various controllers as the limit torque amount.

Figure 20:
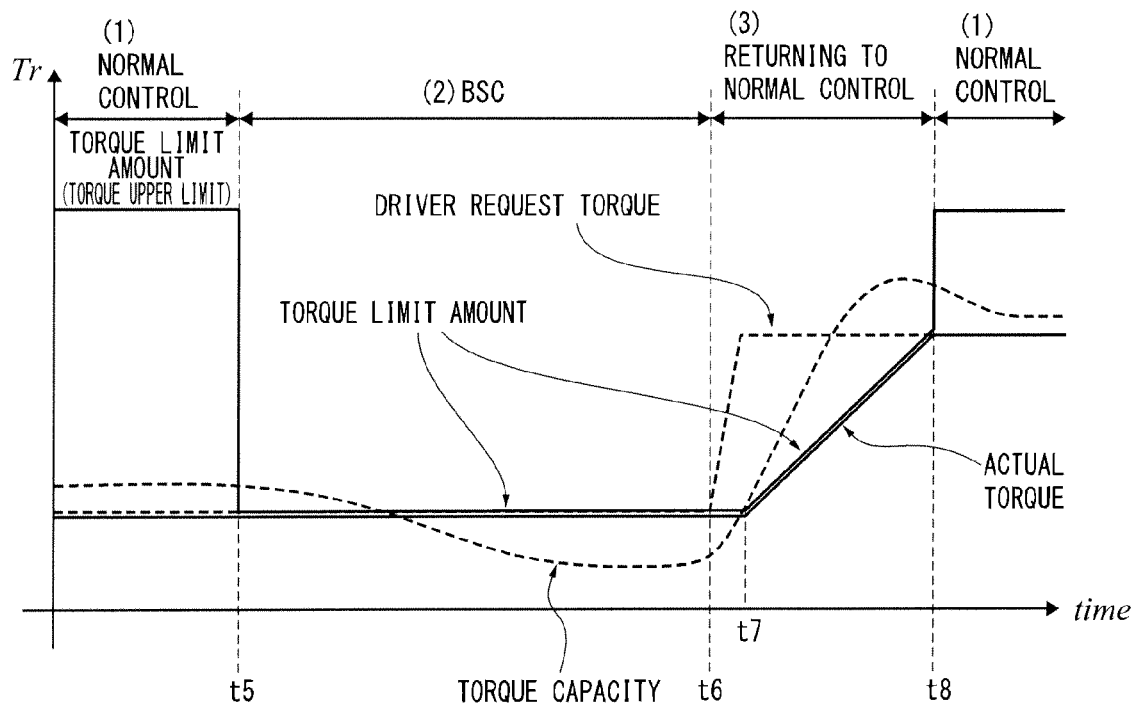
FIG. 20 is a timing chart of the characteristics of driver request torque, torque limit amount, torque capacity, and actual torque to illustrate the torque limit control based on torque delay used in the returning control from the belt slip control to the normal control.

Specifically, at time t5 the phase (1) of the normal control is shifted into the belt slip control, and the torque limit request from the BSC is sent to the engine control unit 88 in the phase (2) as shown in the limit torque amount characteristic in FIG. 20. However, the torque limit request from the BSC during the BSC (phase (2) in FIG. 20) is for preparation in advance for the torque limiting in FIG. 10 and does not virtually function as a torque limit during the BSC (phase (2) in FIG. 20).

Then, at time t6 the BSC continuation is aborted and shifted into the control to return to the normal control. At time t6 a torque limit request is issued because of the driver request torque>torque limit request from the BSC and the calculated torque capacity≤torque limit request from the BSC. Therefore, the flow from step S521→step S522→step S524 to RETURN in the flowchart in FIG. 10 is repeated to maintain the torque limit request from the BSC (previous value) in step S524.

Thereafter, at time t7 the driver request torque>torque limit request from the BSC and the calculated torque capacity>torque limit request from the BSC. The flow from step S521→step S522→step S523 to RETURN in FIG. 10 is repeated to gradually increase the torque limit request from the BSC to be (previous value+ΔT). Along with this rising gradient, the actual torque gradually rises.

Due to the rise of the torque limit request from the BSC since time t7, at time t8 the driver request torque≤torque limit request from the BSC and the calculated torque capacity>torque limit request from the BSC. The flow proceeds from step S521→step S525→step S527 to END in the flowchart in FIG. 10. In step S527 the torque limit from the BSC is cancelled.

In this example the flow skips step S526 which is executed when the accelerator is manipulated as stepped on or returned (released) for a short period of time. Specifically, step S526 is skipped when the belt slip control is cancelled by stepping-on of the accelerator and the accelerator is released as soon as the returning control starts.

In returning from the belt slip control to the normal control, by limiting the change speed of the input torque to the belt type continuously variable transmission 4, it is made possible to prevent an excessive increase in the input torque relative to the belt clamp force and prevent the belt from greatly slipping due to a sudden increase in the belt slip rate from micro slip to macro slip.

In returning from the belt slip control to the normal control, with a change in the gear ratio at a normal transmission speed while the change speed of the input torque to the belt type continuously variable transmission mechanism 4 is suppressed by the above torque limit control, the input torque is significantly reduced according to a change in the rotary inertia. This makes a driver feel unnecessary impact (deceleration). In view of this, the change speed of the gear ratio is limited along with a limit to the change speed of the input torque.

That is, upon the termination of the BSC continuation and shift to the control to return to the normal control, the flow from step S541→step S542→step S543→step S544 to step S545 in the flowchart in FIG. 11 is repeated until completion of the transmission. The transmission control is conducted on the basis of the limited target primary rotation rate.

As described above, limiting the primary rotation change rate or lowering the transmission speed makes it possible to reduce a change in the rotary inertia and prevent a reduction in the input torque to the transmission. As a result, it is possible to prevent a driver from feeling unnecessary impact (deceleration) in returning to the normal control.

Next, the effects of the control device and method for the belt type continuously variable transmission mechanism 4 according to the first embodiment are described in the following.

(1) A vehicle belt type continuously variable transmission of a vehicle includes a primary pulley 42 and a secondary pulley 43 around which a belt 44 is wound so as to generate a belt clamping force according to an input torque from a driving force by controlling a secondary hydraulic pressure. A control device therefore includes a belt slip control means (FIG. 8) that oscillates the secondary hydraulic pressure and extracts an oscillation component due to oscillation from the basic component of an actual secondary hydraulic pressure when a change speed of the input torque is less than a predetermined value, to control the secondary hydraulic pressure based on a phase difference between an oscillation component of an actual gear ratio and the oscillation component of the actual secondary hydraulic pressure due to oscillation, a limit determining means (steps S21, S22, and S26 in FIG. 12) that determines whether to limit acceleration of the vehicle, and an input torque change speed limiting means (step S23 in FIG. 12) that limits the change speed of the input torque to less than the predetermined value when the limit determining means makes a determination to limit the acceleration of the vehicle. The belt slip control means permits the belt slip control while the input torque change speed limiting means is limiting the change speed of the input torque to less than the predetermined value.

Thus, it is possible to provide a control device for a vehicle belt type continuously variable transmission which can expand the operation range in which the belt slip control is permitted with the estimated accuracy of a belt slip condition being maintained, to thereby improve the reducing effects of driving energy consumption by a decrease in belt friction.

(2) The limit determining means is configured to determine to limit the acceleration of the vehicle when an economical drive mode is selected from a normal drive mode and the economical drive mode (step S21 in FIG. 12).

Thus, in addition to the effects in the item (1), it is possible to expand the operation range in which the belt slip control is permitted, in response to a driver's intention for having selected the economical drive mode.

(3) The device further includes a switch (ECO switch 89) configured to allow a driver to select the normal drive mode or the economical drive mode. This makes it possible to promptly, certainly reflect, in the belt slip control, a driver's intention for preferring the economical drive mode by a simple switch manipulation, in addition to the effects in the item (2).

(4) The limit determining means is configured to determine to limit the acceleration of the vehicle when an increase speed of either an accelerator opening or a throttle opening is equal to or lower than a predetermined speed (steps S22 and S26 in FIG. 12, FIGS. 13, 14).

In addition to the effects in the items (1) to (3), it is possible to set the operation range with a low acceleration request level to be the operation range in which the belt slip control is permitted, in accordance with a driver's acceleration request represented by an increase speed of the accelerator opening or throttle opening.

In combination with the selection of driving mode, for example, when a driver has selected the economical drive mode, the operation range in which the belt slip control is permitted can be set to an expanded range with a high acceleration request level, with fuel economy preferentially taken into consideration (FIG. 13). Further, when the driver's selected mode is the normal drive mode, the operation range in which the belt slip control is permitted can be set to a range with a low acceleration request level during normal driving, with acceleration performance preferentially taken into consideration (FIG. 14).

(5) A control method for a vehicle belt type continuously variable transmission which comprises a pair of pulleys 42, 43 around which a belt 44 is wound to generate a belt clamping force according to an input torque from a driving source (engine 1) by controlling hydraulic pressures of the pulleys 42, 43, the method comprises the steps of, when a change speed of the input torque is less than a predetermined value, oscillating the hydraulic pressure and extracting an oscillation component due to the oscillation from a basic component of an actual hydraulic pressure so as to permit a belt slip control over the hydraulic pressures on the basis of a phase difference between the oscillation component of an actual gear ratio and the oscillation component of the hydraulic pressure; and limiting the change speed of the input torque to less than the predetermined value and permitting the belt slip control when determining to limit acceleration of the vehicle.

Thus, it is possible to provide a control method for a vehicle belt type continuously variable transmission which can expand the operation range in which the belt slip control is permitted with the estimated accuracy of a belt slip condition maintained, to thereby improve the reducing effects of driving energy consumption by a decrease in belt friction.

Although the control device and method for a vehicle belt type continuously variable transmission have been described in terms of the exemplary first embodiment, it is not limited thereto. It should be appreciated that variations or modifications may be made in the embodiments described by persons skilled in the art without departing from the scope of the present invention as defined by the following claims.

According to the first embodiment, the predetermined value to which the transmission speed limiting means limits the gear ratio change rate is set to the same value as the threshold for the BSC permission and continuation conditions of |command gear ratio change rate|. However, it should not be limited thereto. Alternatively, it can be set to a smaller value than the threshold.

The first embodiment has described an example where the normal and economical (ECO) drive modes are determined from ON/OFF of the ECO switch 89 (step S21 in FIG. 12). However, it should not be limited thereto. Alternatively, the normal drive mode or economical drive mode can be determined, irrespective of the driver' switch manipulation, for example, by monitoring the driving condition (accelerator or brake operation) or by a result of drive mode determination or switching in an automatic drive mode switch system.

The first embodiment has described an example where a limit to vehicle acceleration is permitted even during the normal drive mode upon satisfaction of the acceleration limit permitting condition that the throttle opening speed is equal to or below the threshold 2 (step S26 in FIG. 12). This intends for improvement in fuel economy during the normal drive mode by expanding the operation range in which the belt slip control is performed. However, the present invention should not be limited to such an example. Alternatively, the limit to vehicle acceleration can be inhibited during the normal drive mode irrespective of the throttle opening speed. Accordingly, in the flowchart in FIG. 12, the flow omits step S26 and proceeds to step S27 when the normal drive mode is determined in step S21 (when result is NO) and to step S24 with no limit to the target gear ratio change rate.

The first embodiment has described an example where a limit to vehicle acceleration is permitted upon satisfaction of the acceleration limit permitting condition that the throttle opening speed is equal to or below the threshold 1 during the economical drive mode and that it is equal to or below the threshold 1 during the normal drive mode. Instead of the throttle opening speed as a throttle value opening speed, a limit to vehicle acceleration can be determined by the accelerator opening speed as an accelerator pedal pressing speed.

The first embodiment has described an example where a hydraulic pressure circuit of a single side adjusting type controlled by a step motor is used for the transmission hydraulic pressure control unit 7. However, another single side adjusting type or both sides adjusting type transmission hydraulic pressure control unit can be also used.

The first embodiment has described an example where only the secondary hydraulic pressure is oscillated. However, for example, the primary hydraulic pressure together with the secondary hydraulic pressure can be concurrently oscillated at the same phase by a direct acting control system. Alternatively, the primary hydraulic pressure together with the secondary hydraulic pressure can be oscillated at the same phase by oscillating the line pressure.

The first embodiment has described an example of an oscillation means where a signal of oscillation component is superimposed on the command secondary hydraulic pressure signal during arithmetic operation. Alternatively, an output signal of oscillation component can be superimposed on an output solenoid current value.

The first embodiment has described an application example of an engine vehicle incorporating a belt type continuously variable transmission. The present invention is also applicable to a hybrid vehicle incorporating a belt type continuously variable transmission, an electric vehicle incorporating a belt type continuously variable transmission and the like. In short it is applicable to any vehicle incorporating a belt type continuously variable transmission which performs a hydraulic pressure transmission control.

The invention claimed is:

1. A control device for a vehicle belt type continuously variable transmission of a vehicle which comprises a primary pulley and a secondary pulley around which a belt is wound so as to generate a belt clamping force according to an input torque from a driving source by controlling a secondary hydraulic pressure, the control device comprising:
a belt slip control means for performing a belt slip control by oscillating the secondary hydraulic pressure and extracting an oscillation component due to oscillation from a basic component of an actual secondary hydraulic pressure when a change speed of the input torque is less than a predetermined value so as to control the secondary hydraulic pressure based on a phase difference between an oscillation component of an actual gear ratio and the oscillation component due to oscillation of the actual secondary hydraulic pressure;
a limit determining means for determining whether to limit acceleration of the vehicle; and
an input torque change speed limiting means for limiting the change speed of the input torque to less than the predetermined value when the limit determining means makes a determination to limit the acceleration of the vehicle,
wherein the belt slip control means permits the belt slip control while the input torque change speed limiting means is limiting the change speed of the input torque to less than the predetermined value.

2. The control device for a vehicle belt type continuously variable transmission according to claim 1,
wherein the limit determining means makes the determination to limit the acceleration of the vehicle when an economical drive mode is selected from a normal drive mode and the economical drive mode.

3. The control device for a vehicle belt type continuously variable transmission according to claim 2, further comprising:
a switch configured to allow a driver to select the normal drive mode or the economical drive mode.

4. The control device for a vehicle belt type continuously variable transmission according to claim 1,
wherein the limit determining means makes the determination to limit the acceleration of the vehicle when an increase speed of one of an accelerator opening and a throttle opening is equal to or lower than a predetermined speed.

5. A control method for a vehicle belt type continuously variable transmission of a vehicle, which transmission comprises a pair of pulleys around which a belt is wound so as to generate a belt clamping force according to an input torque from a driving source by controlling a hydraulic pressure of the pulleys, the method comprising:
when a change speed of the input torque is less than a predetermined value, oscillating the hydraulic pressure of each of the pair of pulleys, and extracting an oscillation component due to oscillation from a basic component of an actual hydraulic pressure so as to permit a belt slip control of the hydraulic pressure based on a phase difference between an oscillation component of an actual gear ratio and the oscillation component due to oscillation of the actual hydraulic pressure; and
limiting the change speed of the input torque to less than the predetermined value and permitting the belt slip control when making a determination to limit acceleration of the vehicle.

6. A control device for a vehicle belt type continuously variable transmission of a vehicle which comprises a primary pulley and a secondary pulley around which a belt is wound so as to generate a belt clamping force according to an input torque from a driving source by controlling a secondary hydraulic pressure, the control device comprising:
- a belt slip controller configured to perform a belt slip control, the belt slip control comprising oscillating the secondary hydraulic pressure and extracting an oscillation component due to oscillation from a basic component of an actual secondary hydraulic pressure when a change speed of the input torque is less than a predetermined value so as to control the secondary hydraulic pressure based on a phase difference between an oscillation component of an actual gear ratio and the oscillation component due to oscillation of the actual secondary hydraulic pressure;
- a limit determining control unit configured to determine whether to limit acceleration of the vehicle; and
- an input torque change speed limiter control unit configured to limit the change speed of the input torque to less than the predetermined value when the limit determining control unit makes a determination to limit the acceleration of the vehicle, wherein the belt slip controller is configured to permit the belt slip control while the input torque change speed limiter control unit is limiting the change speed of the input torque to less than the predetermined value.

7. The control device for a vehicle belt type continuously variable transmission according to claim 6,
wherein the limit determining control unit is configured to make the determination to limit the acceleration of the vehicle when an economical drive mode is selected from a normal drive mode and the economical drive mode.

8. The control device for a vehicle belt type continuously variable transmission according to claim 7, further comprising:
- a switch configured to allow a driver to select the normal drive mode or the economical drive mode.

9. The control device for a vehicle belt type continuously variable transmission according to claim 6,
wherein the limit determining control unit is configured to make the determination to limit the acceleration of the vehicle when an increase speed of one of an accelerator opening and a throttle opening is equal to or lower than a predetermined speed.

* * * * *